US008564905B1

(12) United States Patent
Umehara et al.

(10) Patent No.: US 8,564,905 B1
(45) Date of Patent: Oct. 22, 2013

(54) THIN-FILM MAGNETIC HEAD AND METHOD OF MAKING WHERE THE HEAD INCLUDES AN ANTIREFLECTION FILM COVERING A LEADING SHIELD

(75) Inventors: Hiromichi Umehara, Tokyo (JP); Masashi Sano, Tokyo (JP); Atsushi Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 5 days.

(21) Appl. No.: 13/459,472

(22) Filed: Apr. 30, 2012

(51) Int. Cl.
*G11B 5/127* (2006.01)
*G11B 5/187* (2006.01)

(52) U.S. Cl.
USPC ............ 360/125.3; 360/125.06; 360/125.11; 360/125.71

(58) Field of Classification Search
USPC ............... 360/125.3, 125.11, 125.71, 110, 360/125.02, 125.06, 125.33, 125.38, 125.39
See application file for complete search history.

(56) References Cited

U.S. PATENT DOCUMENTS

| 2009/0086385 A1* | 4/2009 | Gill et al. ................. 360/324.11 |
| 2009/0122445 A1* | 5/2009 | Jiang et al. ............... 360/123.12 |
| 2011/0216447 A1* | 9/2011 | Li et al. ......................... 360/313 |
| 2012/0127612 A1* | 5/2012 | Shin et al. ................ 360/123.12 |

FOREIGN PATENT DOCUMENTS

JP   2007-257815   10/2007

\* cited by examiner

*Primary Examiner* — Jefferson Evans
(74) *Attorney, Agent, or Firm* — Oblon, Spivak, McClelland, Maier & Neustadt, L.L.P.

(57) ABSTRACT

A thin-film magnetic head has a high write performance because its shape is smooth without roughness. The thin-film magnetic head includes a slider substrate, a write element and an antireflection film. The slider substrate has an air bearing surface at one side and supports a first support layer. The first support layer has a leading shield, and the leading shield has a low-level flat part, a slope part and a high-level flat part continuously arranged at one side in the recited order toward the air bearing surface. The antireflection film entirely covers the low-level flat part, the slope part and the high-level flat part of the leading shield. The write element has a recording magnetic pole film, and the recording magnetic pole film is formed above the antireflection film.

32 Claims, 27 Drawing Sheets

THIN-FILM MAGNETIC HEAD AND METHOD OF MAKING WHERE THE HEAD INCLUDES AN ANTIREFLECTION FILM COVERING A LEADING SHIELD

TECHNICAL FIELD

The present invention relates to a thin-film magnetic head, a thin-film magnetic head device, a magnetic recording/reproducing apparatus and a method for manufacturing a thin-film magnetic head.

BACKGROUND OF THE INVENTION

Upon improving recording density of thin-film magnetic heads, it is important to form a narrow main pole layer (recording magnetic pole film) so as to concentrate recording magnetic flux on a recording medium and enable writing of magnetic information onto the recording medium. As one example of its manufacturing method, Japanese Unexamined Patent Application Publication No. 2007-257815 discloses a method in which after a resist is applied, exposed and developed by a photolithography process to form a resist pattern having an opening, a recording magnetic pole film is formed in the opening.

During the exposure upon the formation of the resist pattern, however, a reflected light from a base generates a stationary wave with an incident light to cause roughness on side faces of the resist opening to be used for formation of the recording magnetic pole film, which becomes a big problem in a recording magnetic pole film formation process that requires accurate control of size and shape.

SUMMARY OF THE INVENTION

It is an object of the present invention to provide a thin-film magnetic head, a thin-film magnetic head device and a magnetic recording/reproducing apparatus in which a recording magnetic pole film has high write performance because its opposite side faces appearing in a track width direction are smooth without roughness.

It is another object of the present invention to provide a manufacturing method suitable for manufacture of the above thin-film magnetic head.

In order to attain the above object, a thin-film magnetic head according to the present invention comprises a slider substrate, an antireflection film and a write element. The slider substrate has an air bearing surface at one side and supports a first support layer. The first support layer has a leading shield, and the leading shield has a low-level flat part, a slope part and a high-level flat part continuously arranged at one side in the name order toward the air bearing surface. The antireflection film entirely covers the low-level flat part, the slope part and the high-level flat part of the leading shield. The write element has a recording magnetic pole film, and the recording magnetic pole film is formed above the antireflection film.

With this configuration, since the recording magnetic pole film is laid above the leading shield as seen in a plane perpendicular to the air bearing surface, the recording magnetic pole film itself conforms to the slope part and the flat parts, whereby a supplied magnetic flux can be supplied in a focused manner, so that it can efficiently serve as a recording magnetic pole.

In addition, since the leading shield has a function of narrowing the recording width as well as increasing the magnetic field gradient of a perpendicular magnetic field generated from the recording magnetic pole film, it is also possible to increase the recording density.

With the antireflection film thus described, moreover, the recording magnetic pole film does not have significant roughness, i.e., becomes substantially smooth at opposite side faces of the recording magnetic pole film appearing in a track width direction. With the recording magnetic pole film having such a smooth end face, the recording magnetic flux can be accurately focused on a recording medium to perform accurate magnetic recording. It should be noted that the antireflection film can be removed after the formation of the recording magnetic pole film, but the thin-film magnetic head in which the antireflection film is left is superior in cost performance because it does not need a process of removing the antireflection film.

The antireflection film can be configured to have "a light absorption layer and an antireflection protective film" or "a composite layer composed of a single light absorption layer and an adjacent single transparent film" or "the composite layer and an antireflection protective film" or "a plurality of the composite layers" or "a plurality of the composite layers and an antireflection protective film." When the antireflection film is formed by depositing materials of different optical constants in two or more layers, as described above, the opposite side faces of the recording magnetic pole film appearing in the track width direction can be substantially smoothed because of factors during the manufacturing process.

Moreover, the thin-film head according to the present invention can be combined with a head support device to provide a magnetic head device, and the magnetic head device can be combined with a magnetic recording medium to provide a magnetic recording/reproducing apparatus (HDD).

Upon manufacturing the thin-film magnetic head according to the present invention, the antireflection film is deposited over the low-level flat part, the slope part and the high-level flat part of the leading shield. Then, it also includes steps of applying a photoresist film and performing a photolithography process on the photoresist film according to a pattern required for the recording magnetic pole film so as to form a cut-out pattern by exposure and developing.

Specifically, after the formation of the cut-out pattern, the recording magnetic pole film can be formed within the cut-out pattern, and then, after the photoresist film is removed, a second support layer can be formed around the recording magnetic pole film.

According to the above manufacturing method, the thin-film magnetic head according to the present invention can be manufactured easily and steadily. The above manufacturing process may include a process of removing a part or all of the antireflection film.

The other objects, constructions and advantages of the present invention will be further detailed below with reference to the attached drawings. However, the attached drawings show only illustrative examples.

DESCRIPTION OF THE PREFERRED EMBODIMENTS

1. Thin-film Magnetic Head

FIGS. 1 to 8 show the external appearance of a thin-film magnetic head to be used in combination with a rapidly spinning magnetic recording medium such as a hard disk and its details. Thin-film magnetic heads of this type are generally called "floating-type".

At first, a common structure of thin-film magnetic heads will be described with reference to FIGS. 1 to 4. In the thin-film magnetic head, as shown in these figures, a thin-film element RW for performing both recording and reproducing processes is attached to one face of a slider substrate 1 comprising, for example, a non-magnetic insulating material such as AlTiC and having a generally rectangular prism structure. The slider substrate 1 has an air bearing surface 70 directly relating to floating characteristics, and the thin-film element RW is attached to a trailing-side end face that is perpendicular to the air bearing surface 70.

On the trailing-side end face, bumps 91 to 94 are provided for the thin-film element RW. In thin-film magnetic heads of this type, the thin-film element RW includes a recording element and a reproducing element, and usually, four bumps 91 to 94 are provided according to these elements.

Figure 1:
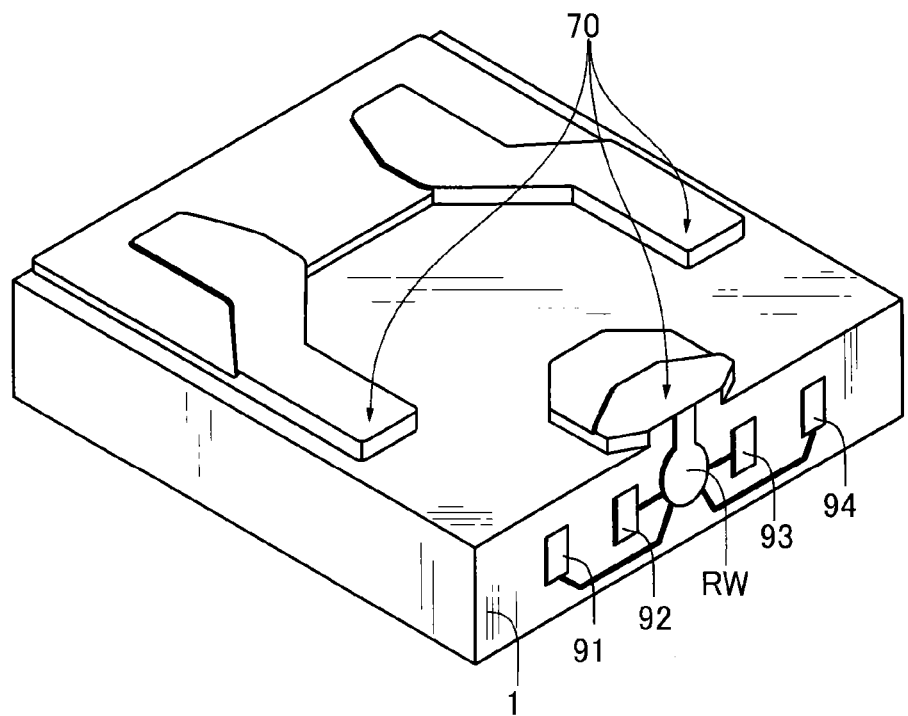
FIG. 1 is a perspective view showing external appearance of a thin-film magnetic head according to the present invention.
Figure 1:
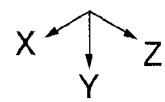
Figure 2:
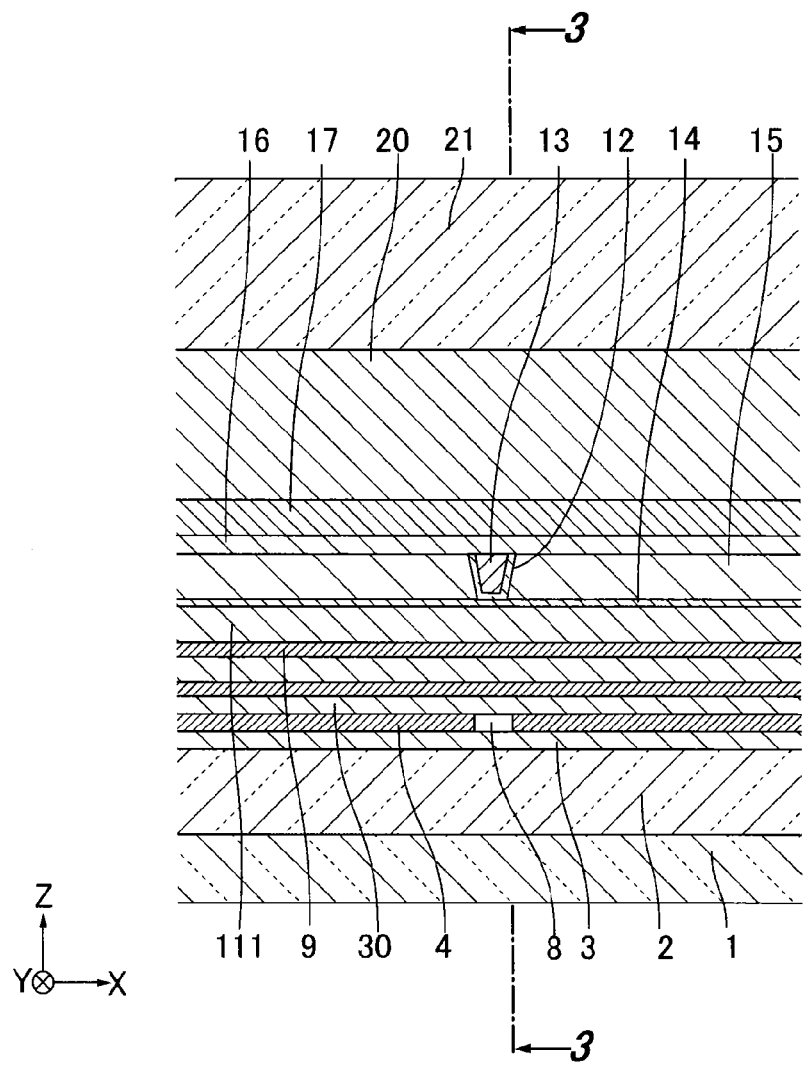
FIG. 2 is a plan view showing a RW element and its surroundings as the thin-film magnetic head of FIG. 1 is seen from the side of an air bearing surface.
Figure 3:
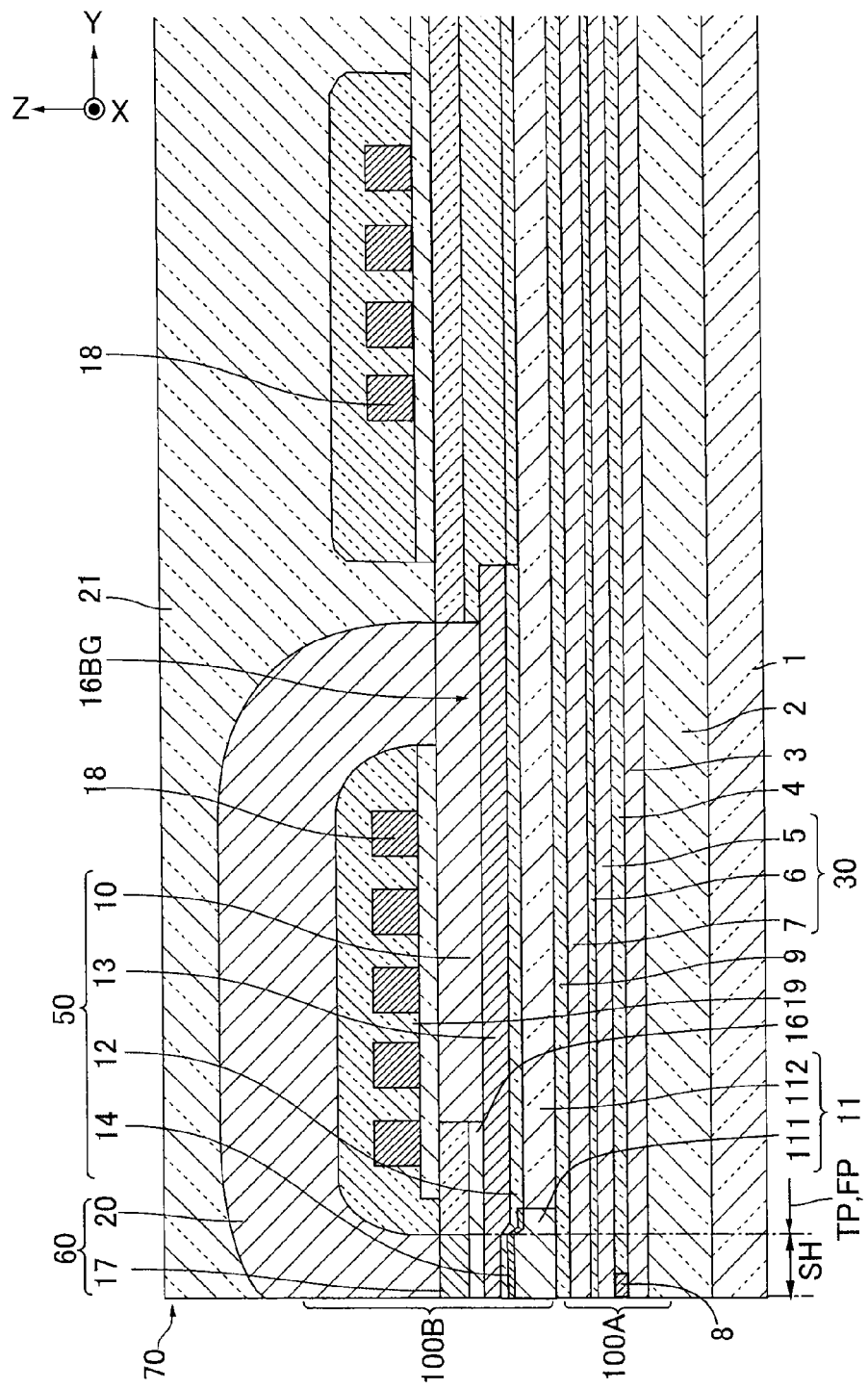
FIG. 3 is a sectional view taken along the line 3-3 in FIG. 2.
Figure 4:
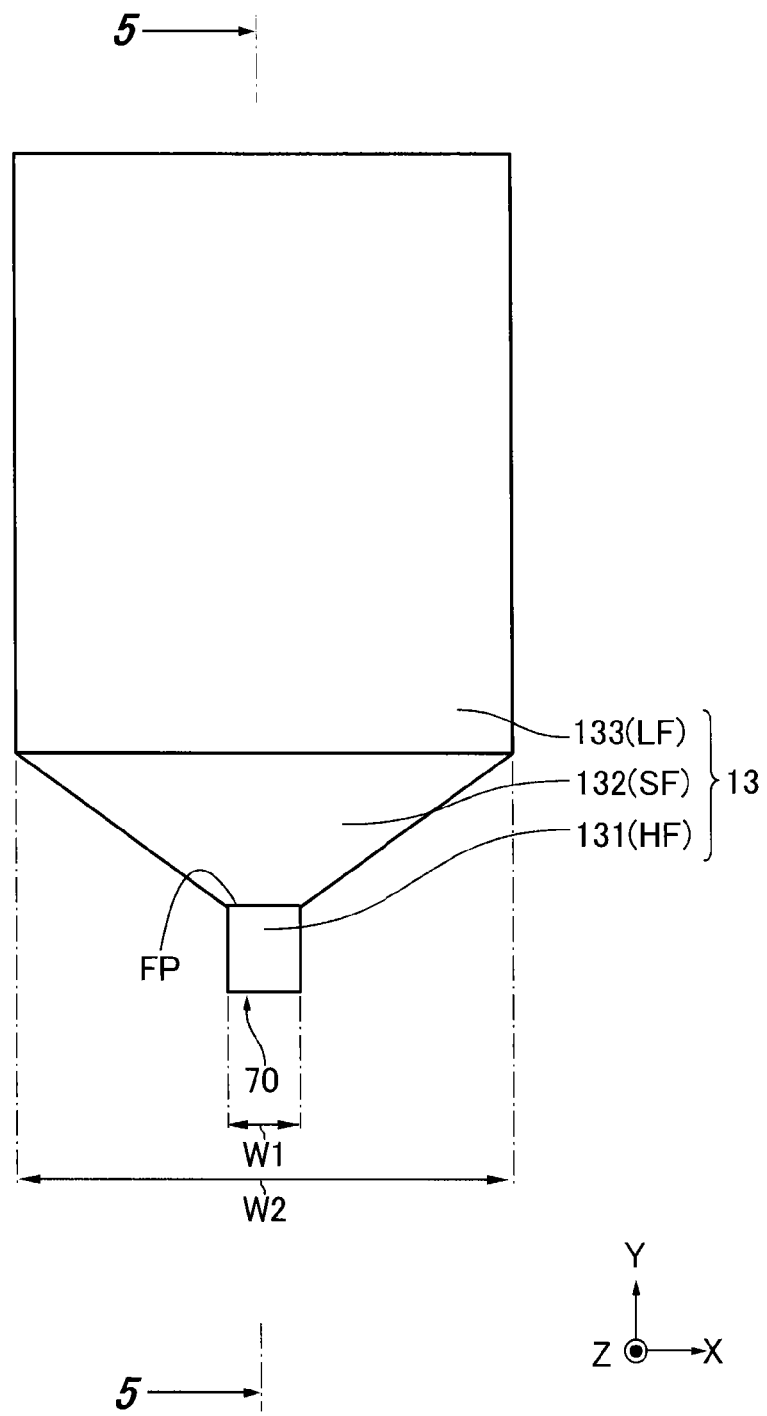
FIG. 4 is an enlarged partial plan view of a recording magnetic pole film of the thin-film magnetic head of FIG. 2 as seen in a stacking direction.

Details of the thin-film element RW are shown in FIGS. 2 to 4. In FIGS. 2 to 4, dimensions along X, Y and Z axes are called "width", "length" and "thickness/height", respectively. Along the Y axis, moreover, one side close to the air bearing surface 70 and the other side remote therefrom are designated by "front" and "rear", respectively, and being positioned forward and being positioned rearward may be expressed by "proceeding" and "receding", respectively.

The thin-film magnetic head is a complex-type head which can perform recording/reproducing of magnetic information in association with a magnetic recording medium (hard disk). In the thin-film magnetic head, an insulating layer 2, a reproducing head portion 100A for performing a reproducing process using magneto-resistive effect (MR effect), a separating layer 9, a recording head portion 100B for performing a recording process in a perpendicular recording method, and an overcoat layer 21 are stacked in the named order on the slider substrate 1 comprising, for example, a non-magnetic insulating material such as AlTiC.

The insulating layer 2, the separating layer 9 and the overcoat layer 21 comprise, for example, a non-magnetic insulating material such as aluminium oxide ($Al_2O_3$).

The reproducing head portion 100A is formed, for example, by stacking a lower read shield layer 3, a shield gap film 4, and an upper read shield layer 30 in the named order. In the shield gap film 4, a reproducing element 8 is embedded in such a manner as to be exposed on the air bearing surface 70 to be opposed to the recording medium 80.

Both the lower read shield layer 3 and the upper read shield layer 30 magnetically separate the MR element 8 from the surroundings and extend rearward from the air bearing surface 70. The lower read shield layer 3 comprises, for example, a magnetic material such as a nickel-iron alloy (NiFe (e.g., 80 wt. % of Ni and 20 wt. % of Fe): hereinafter merely referred to as "permalloy (trade name)"). The upper read shield layer 30 is formed, for example, by stacking two upper read shield layer portions 5, 7 with a non-magnetic film 6 interposed therebetween. Both the upper read shield layer portions 5, 7 comprise, for example, a magnetic material such as a permalloy. The non-magnetic film 6 comprises, for example, a non-magnetic material such as ruthenium (Ru) or alumina. The upper read shield layer 30 is not necessarily required to have a multilayer structure but may have a single-layer structure of a magnetic material.

The shield gap film 4 electrically separates the MR element 8 from the surroundings and comprises, for example, a non-magnetic insulating material such as alumina. The MR element 8 uses giant magneto-resistive effect (GMR) or tunneling magneto-resistive effect (TMR), for example.

The recording head portion 100B is, for example, a perpendicular magnetic recording head, i.e., a so-called shield-type head formed by stacking a magnetic pole film 50 embedded in a first support layer 11 and a second support layer 15, a gap film 16 having an opening (back gap 16BG) for magnetic connection, a thin-film coil 18 embedded in an insulating film 19, and a magnetic film 60 in the named order.

At its front, the first support layer 11 has a leading shield 111 adjacent to the air bearing surface 70. The leading shield layer 111 is a magnetic shield layer that is made of a soft magnetic material and has a function of increasing the magnetic field gradient of a perpendicular magnetic field to narrow the recording width. At its rear, furthermore, the first support layer 11 has a non-magnetic layer 112.

The magnetic pole film 50 leads a magnetic flux to the recording medium and, for example, extends rearward from the air bearing surface 70. The magnetic pole film 50 is formed, for example, by stacking a non-magnetic film 12, a recording magnetic pole film 13 and an auxiliary magnetic pole film 10 in the named order.

The auxiliary magnetic pole film 10, for example, extends from behind the air bearing surface 70 to the back gap 16BG. The auxiliary magnetic pole film 10 is, for example, disposed on the trailing side with respect to the recording magnetic pole film 13. The non-magnetic layer 112 electrically and magnetically separates the auxiliary magnetic pole film 10 from the surroundings and comprises, for example, a non-magnetic insulating material such as alumina.

The non-magnetic film 12 is a first non-magnetic film electrically and magnetically separating the recording magnetic pole film 13 from the surroundings. The non-magnetic film 12, for example, extends from the air bearing surface 70 to the forefront position of the auxiliary magnetic pole film 10 and comprises a non-magnetic insulating material such as alumina or aluminium nitride. However, the range over which the non-magnetic film 12 extends may be set arbitrarily. The section of the non-magnetic film 12 parallel to the air bearing surface 70 is U-shaped, and the recording magnetic pole film 13 is partially embedded in the non-magnetic film 12. Particularly, the non-magnetic film 12 includes a non-magnetic film formed by an ALD process, for example, and has a uniform thickness along the periphery (bottom face and both side faces) of the recording magnetic pole film 13.

The second support layer 15 is embedded outside the non-magnetic film 12 and comprises, for example, a non-magnetic insulating material such as alumina. In the case of employing a side-shield structure, alternatively, it may comprise a magnetic material.

The recording magnetic pole film 13 is a main magnetic flux-emitting portion and extends, for example, from the air bearing surface 70 to the back gap 16BG. As shown in FIG. 4, the recording magnetic pole film 13 includes small-width portions 131, 132 and a large-width portion 133 and has a table tennis racket-like plan shape as a whole, wherein as seen in a stacking direction (Z-axis direction), the large-width portion 133 corresponds to a low-level flat part LF, the small-width portion 132 corresponds to a slope part SF, and the small-width portion 131 corresponds to a high-level flat part HF. More specifically, it has a small-width portion composed of the first and second small-width portions 131, 132 and the large-width portion 133 in the named order from the air bearing surface 70. The first small-width portion 131 is a substantial magnetic flux-emitting portion and has a constant width W1 which defines a recording track width. The second small-width portion 132 is a portion from which a magnetic flux is supplied to the first small-width portion 131. The second small-width portion 132 is continuous, at its rear end, with the large-width portion 133 having a constant width (W2) and gradually narrows forward toward the first small-width portion 131. When the recording magnetic pole film 13 is seen from the air bearing surface 70, however, the second small-width portion 132 can be construed as a width-increasing portion. With this configuration, the magnetic flux can be efficiently supplied from the large-width portion 133 to the first small-width portion 131 which should serve as a recording magnetic pole. The position where the width of the recording magnetic pole film 13 starts to increase from W1 to W2 is a so-called flare point FP. The width W1 is equal to or less than about 0.2 μm.

Although not illustrated, the present invention is also applicable to a thermally-assisted magnetic head. The thermally-assisted magnetic head has a function of enabling writing of data with coercivity of a recording medium being locally reduced by using heat of laser beam or the like. Preferably, the thermally-assisted magnetic head includes an optical waveguide and a near-field light generating element such as surface plasmon generating element, wherein the end face of the recording magnetic pole film 13 on the air bearing surface 70 is located close to the near-field light generating element.

Also, although not illustrated, the recording magnetic pole film 13 includes a seed layer and a plating layer formed on the seed layer. The seed layer is used to let the plating layer grow in a thin-film magnetic head manufacturing process and comprises, for example, a magnetic material similar to that of the plating layer. The plating layer comprises, for example, a magnetic material having a high saturation magnetic flux density such as a nickel-iron alloy (FeNi) or an iron-based alloy. Examples of the iron-based alloy include an iron-cobalt alloy (FeCo) and an iron-cobalt-nickel alloy (FeCoNi).

The gap film 16 is a gap for magnetically separating the recording magnetic pole film 13 from the magnetic film 60 and comprises, for example, a non-magnetic insulating material such as alumina or a non-magnetic conductive material such as ruthenium. The gap film 16 has a thickness of about 0.03 μm to 0.1 μm.

The thin-film coil 18 generates a magnetic flux and comprises, for example, a highly conductive material such as copper (Cu). The thin-film coil 18 is wound around the back gap 16BG to have a winding structure (or spiral structure).

The insulating film 19 electrically separates the thin-film coil 18 from the surroundings and comprises, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called throat height SH. For example, FIG. 3 shows a case where the throat height zero position TP matches the flare point FP.

The magnetic film 60 absorbs a spreading component of a magnetic flux emitted from the recording magnetic pole film 13 toward the recording medium so as to increase the gradient of the perpendicular magnetic field and also absorbs a magnetic flux after recording so as to circulate the magnetic flux between the recording head portion 100B and the recording medium. The magnetic film 60, which extends rearward from the air bearing surface 70 on the trailing side of the recording magnetic pole film 13, is separated from the recording magnetic pole film 13 by the gap film 16 at its front but connected to the recording magnetic pole film 13 through the back gap 16BG at its rear. On the side close to the air bearing surface 70, the magnetic film 60 has an end face which is, for example, of a rectangular shape. The magnetic film 60 includes, for example, a write shield layer 17 and a return yoke layer 20 which are distinct from each other.

The write shield layer 17 mainly has a function of increasing the gradient of the perpendicular magnetic field and comprises, for example, a magnetic material having a high saturation magnetic flux density such as a permalloy or an iron-based alloy. Particularly by absorbing a spreading component of a magnetic flux emitted from the recording magnetic pole film 13, the write shield layer 17 (1) increases the magnetic field gradient of the perpendicular magnetic field, (2) decreases the recording width, and (3) incorporates an oblique magnetic field component into the perpendicular magnetic field. However, the write shield layer 17 may also have a function of circulating the magnetic flux like the return yoke layer 20. The write shield layer 17 is disposed adjacent to the gap film 16 and extends rearward from the air bearing surface 70 to have its rear end adjacent to the insulating film 19. Thus, the write shield layer 17 serves to define the forefront position (throat height zero position TP) of the insulating film 19.

The return yoke layer 20 has a function of circulating the magnetic flux and comprises, for example, a magnetic material similar to that of the write shield layer 17. The return yoke layer 20 extends from the air bearing surface 70, through above the insulating film 19, to the back gap 16BG on the trailing side of the write shield layer 17 and is connected to the write shield layer 17 at its front but connected to the recording magnetic pole film 13 at its rear through the back gap 16BG.

The overcoat layer 21 protects the thin-film magnetic head and comprises, for example, a non-magnetic insulating material such as alumina.

What has been described above is a common structure of thin-film magnetic heads. The present invention is characterized in that in such a common thin-film magnetic head, an antireflection film 14 is provided so as to smooth opposite side faces ST of the recording magnetic pole film 13 appearing in a track width direction and improve write performance. The characteristic feature of the present invention will be described below with reference to FIGS. 5 to 8.

Figure 5:
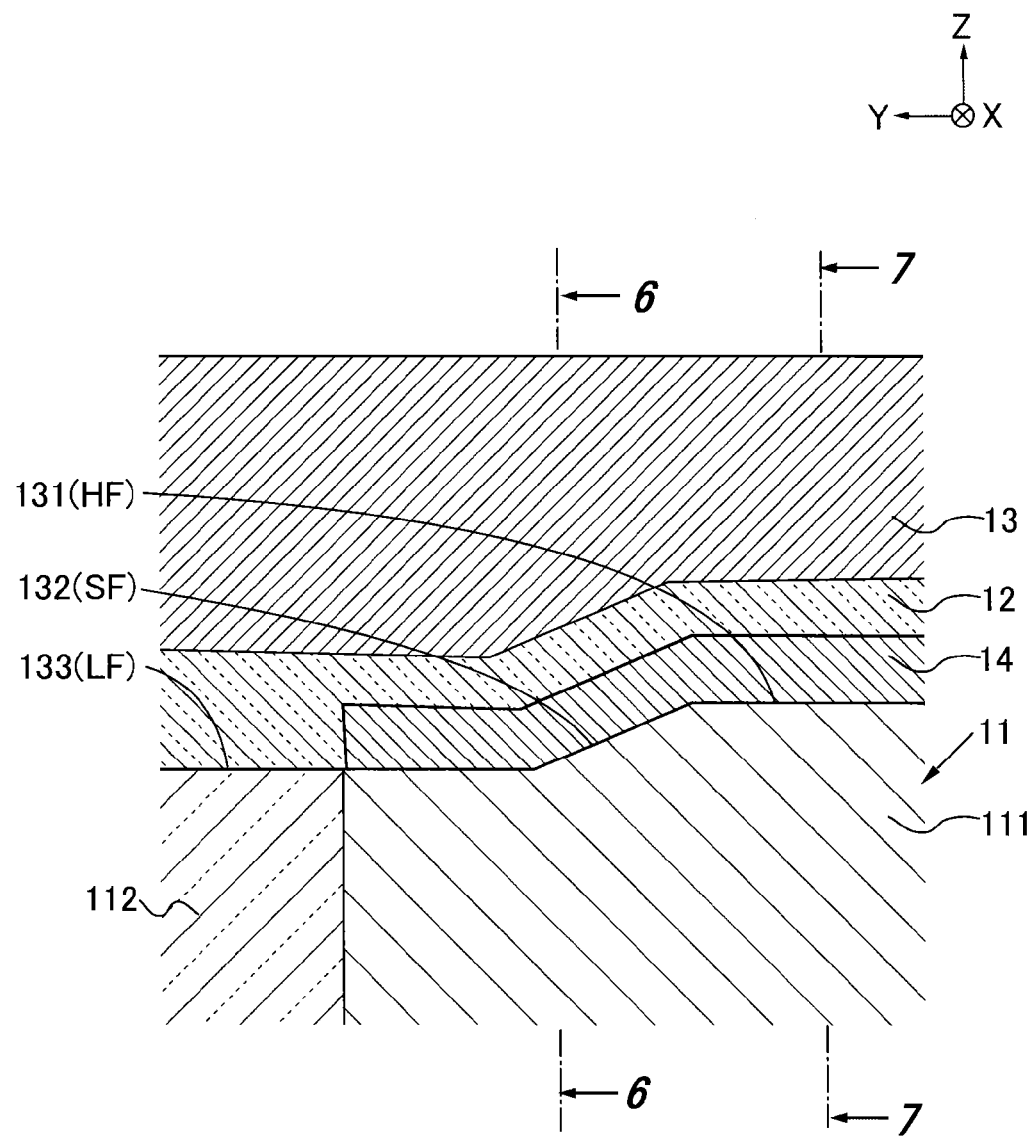
FIG. 5 is an enlarged partial sectional view taken along the line 5-5 in FIG. 4.
Figure 6:
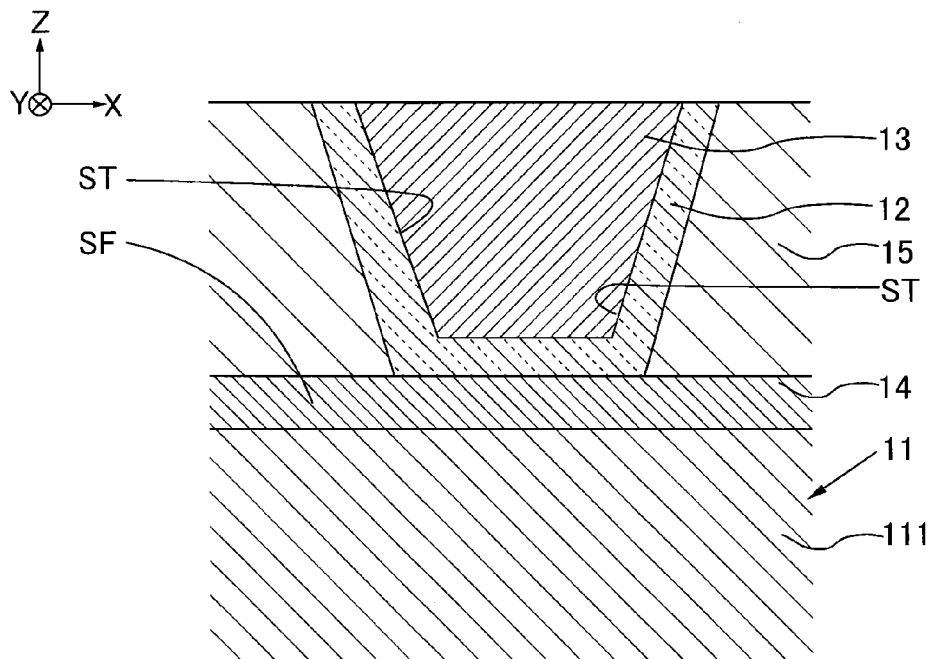
FIG. 6 is a sectional view taken along the line 6-6 in FIG. 5.
Figure 7:
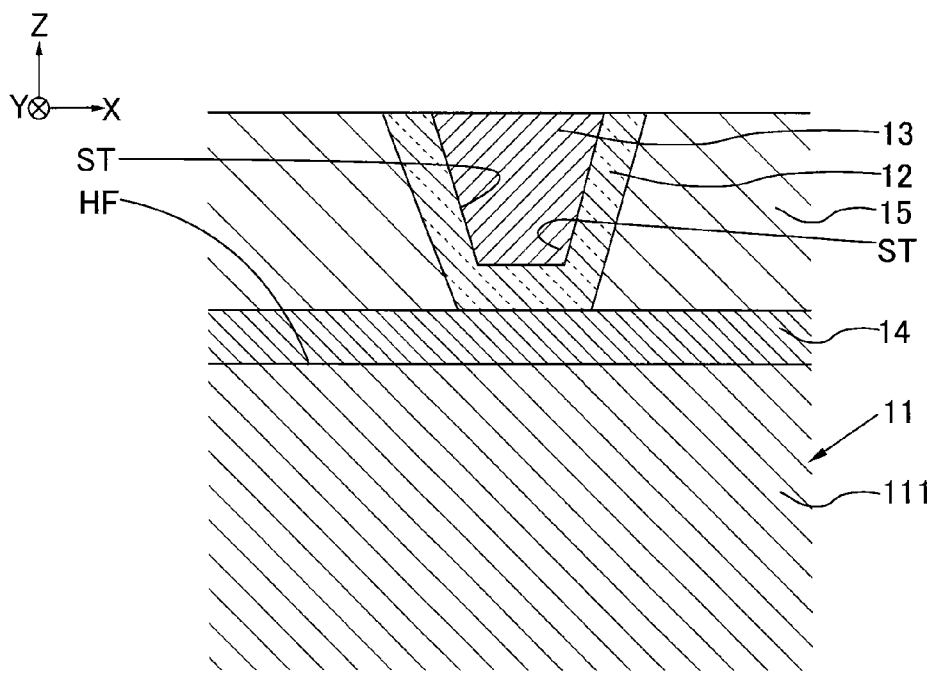
FIG. 7 is a sectional view taken along the line 7-7 in FIG. 5.

FIG. 5 is an enlarged sectional view taken along the line 5-5 in FIG. 4, FIG. 6 is a sectional view taken along the line 6-6 in FIG. 5, and FIG. 7 is a sectional view taken along the line 7-7 in FIG. 5. From them, it is seen that the antireflection film 14 is located between the non-magnetic film 12 and the leading shield 111.

When the antireflection film 14 having such a configuration is disposed between the recording magnetic pole film 13 and the leading shield 111, the opposite side faces ST of the recording magnetic pole film 13 can be made substantially smooth without significant roughness so as to attain an object. With such smooth opposite side faces ST of the recording magnetic pole film 13, the recording magnetic flux can be accurately focused on a recording medium by the recording magnetic pole film 13 to perform accurate magnetic recording. It should be noted that the antireflection film 14 can be removed after the formation of the recording magnetic pole film 13, but the thin-film magnetic head in which the antireflection film 14 is left is superior in cost performance because it does not need a process of removing the antireflection film 14.

Figure 8:
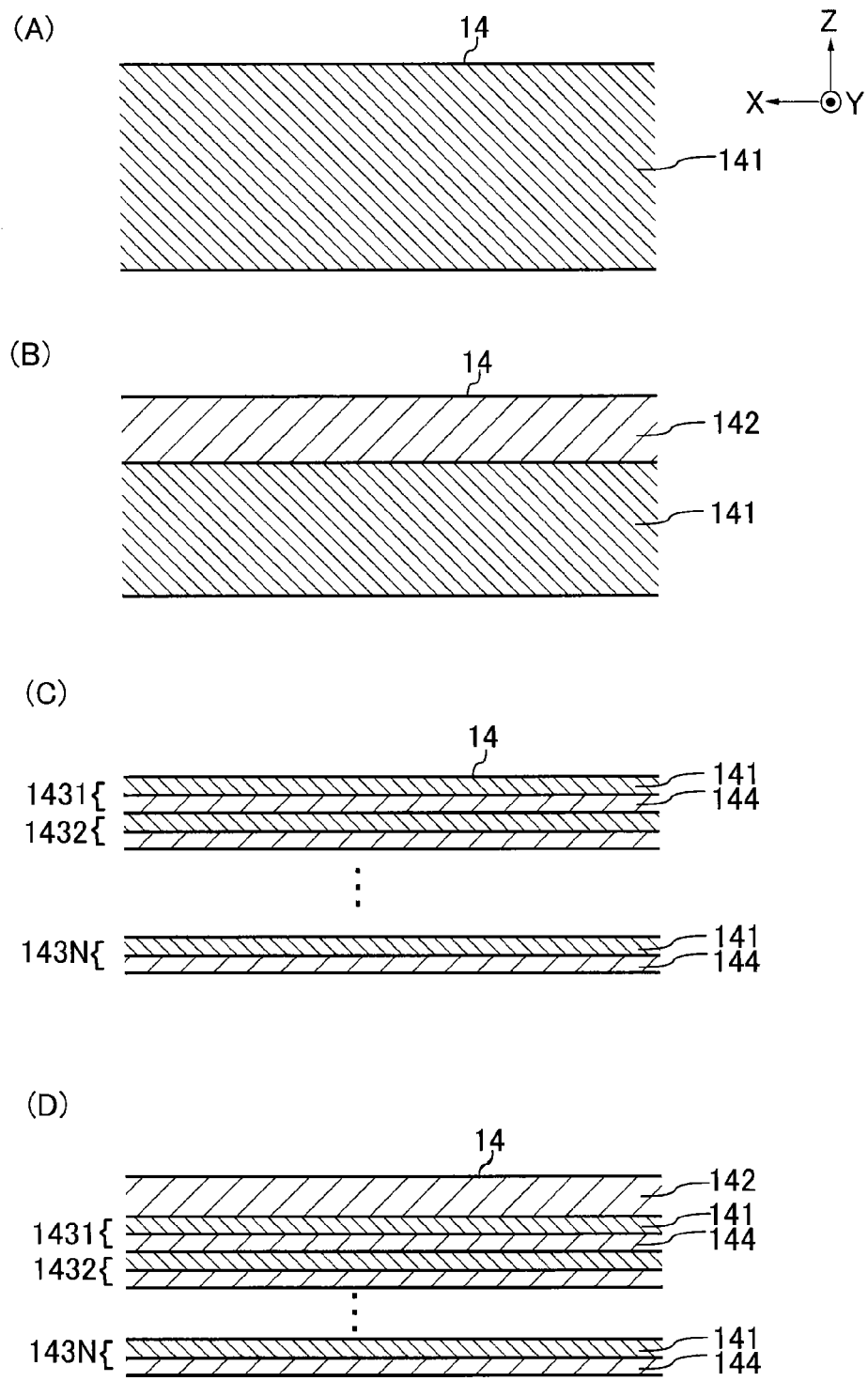
FIG. 8 is a sectional view showing a structure of an antireflection film of a thin-film magnetic head according to the present invention.

Moreover, FIG. 8 is a drawing showing a specific structure of the antireflection film 14. FIG. 8(A) shows a case where the antireflection film 14 consists of a single light absorption layer 141. FIG. 8(B) shows a case where the antireflection film 14 consists of the light absorption layer 141 and a single antireflection protective film 142. FIG. 8(C) shows a configuration where the antireflection film 14 consists of a plurality N (N is an integer larger than 1) of composite layers 1431 to 143N stacked in order. Each of the composite layers 1431 to 143N is composed of the light absorption layer 141 and an adjacent transparent layer 144. FIG. 8(D) shows a configuration where the antireflection film 14 consists of a stack of the composite layers 1431 to 143N shown in FIG. 8(C) and the antireflection protective film 142 laid thereon.

As the light absorption layer 141, preferably used is a material having an extinction coefficient (optical coefficient) of greater than 0.1 for a KrF excimer laser beam (wavelength of 248 nm), an ArF excimer laser beam (wavelength of 192 nm) and an i-beam of a high-pressure mercury lamp (wavelength of 365 nm). Specific examples include translucent oxides such as Cr203, Ta205 and $TiO_2$ and alloys of Ru, Ti, Cr, Ta, Ni, Fe, Cu, Au and so on.

As the antireflection protective film 142, preferably used is a material having a refractive index within the range of ±0.3 for a KrF excimer laser beam (wavelength of 248 nm), an ArF excimer laser beam (wavelength of 192 nm) and an i-beam of a high-pressure mercury lamp (wavelength of 365 nm) with a resist pattern of a side shield form but having an extinction coefficient of 0.1 or less regardless of the resist pattern. Specific examples include $Al_2O_3$ and $SiO_2$.

As the transparent layer 144, preferably used is a material having an extinction coefficient of 0.1 or less for a KrF excimer laser beam (wavelength of 248 nm), an ArF excimer laser beam (wavelength of 192 nm) and an i-beam of a high-pressure mercury lamp (wavelength of 365 nm). Specific examples include transparent oxides such as $Al_2O_3$, $SiO_2$ and MgO.

In the case of having two or more composite layers, the materials and thicknesses of the light absorption layer 141 and the transparent layer 144 may be different for different composite layers. In the case where N is 2 or more in FIGS. 8(C) and 8(D), accordingly, the light absorption layer 141 and the transparent layer 144 of the individual composite layers 1431 to 143N may be of different materials and thicknesses from those of other composite layers. In the case where N is 2, for example, the composite layer 1431 may have a light absorption layer 141 of Ti (30 angstrom) and a transparent layer 144 of $Al_2O_3$ (100 angstrom), while the composite layer 1432 may have a light absorption layer 141 of Cr (20 angstrom) and a transparent layer 144 of $SiO_2$ (50 angstrom). When the antireflection film 14 is formed by depositing materials of different optical constants in two or more layers, as shown in FIGS. 8(B) to 8(D), moreover, the opposite side faces ST of the recording magnetic pole film 13 can be substantially smoothed because of factors during the manufacturing process.

2. Method for Manufacturing Thin-Film Magnetic Head

Next will be described a method for manufacturing the foregoing thin-film magnetic head. Basically, the thin-film magnetic head can be manufactured by forming and stacking a series of components in order using a conventional thin-film process including a film formation technique such as plating or sputtering, a patterning technique such as photolithography, an etching technique such as dry etching or wet etching, and a polishing technique such as chemical mechanical polishing (CMP).

Referring to FIGS. 2 to 4, the reproducing head portion 100A is formed such that at first, the insulating layer 2 is formed on the slider substrate 1, and then the lower read shield layer 3, the shield gap film 4 embedded with the MR element 8 and the upper read shield layer 30 (the upper read shield layer portions 5, 7 and the non-magnetic film 6) are stacked on the insulating layer 2 in the named order.

Then, the recording head portion 100B is formed such that after the insulating layer 9 is formed on the reproducing head portion 100A, the magnetic pole film 50 (the auxiliary magnetic pole film 10, the non-magnetic film 12 and the recording magnetic pole film 13) embedded in the support layers 11, 15, the gap film 16, the thin-film coil 18 embedded in the insulating film 19, and the magnetic film 60 (the write shield layer 17 and the return yoke layer 20) are stacked on the insulating layer 9 in the named order. Finally, after the overcoat layer 21 is formed on the recording head portion 100B, the thin-film magnetic head is completed by forming the air bearing surface 70 using a machining process or a polishing process.

Of the series of manufacturing processes, the manufacturing method according to the present invention has a distinctive feature in the process of manufacturing the recording magnetic pole film 13. A method for manufacturing the recording magnetic pole film 13 will be described with reference to FIGS. 9 to 24. All manufacturing processes illustrated in these figures are conducted on a wafer.

Figure 9:
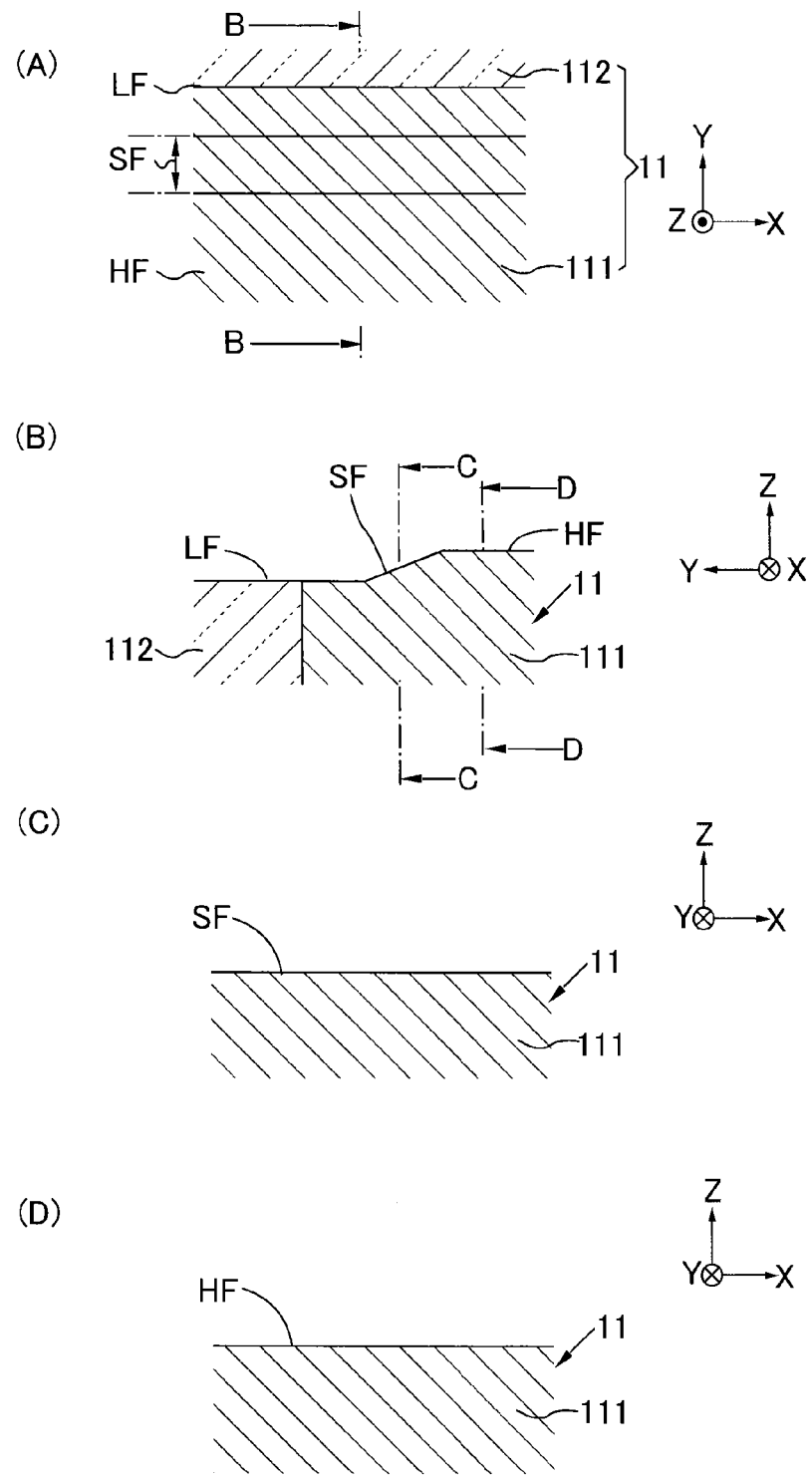
FIG. 9 is a drawing showing a step in a method for manufacturing a thin-film magnetic head according to the present invention.
Figure 10:
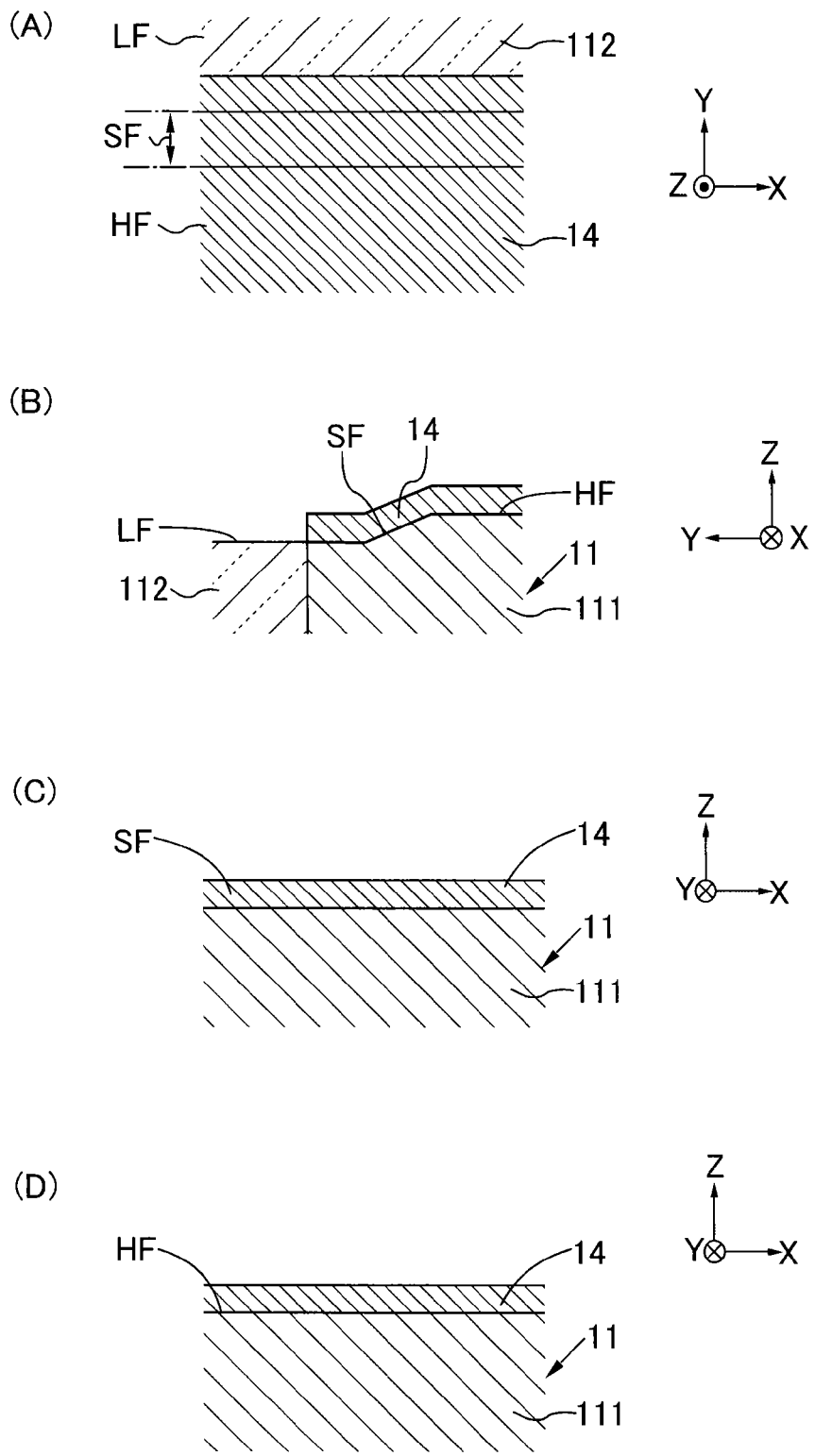
FIG. 10 is a drawing showing a step after the step shown in FIG. 9.
Figure 11:
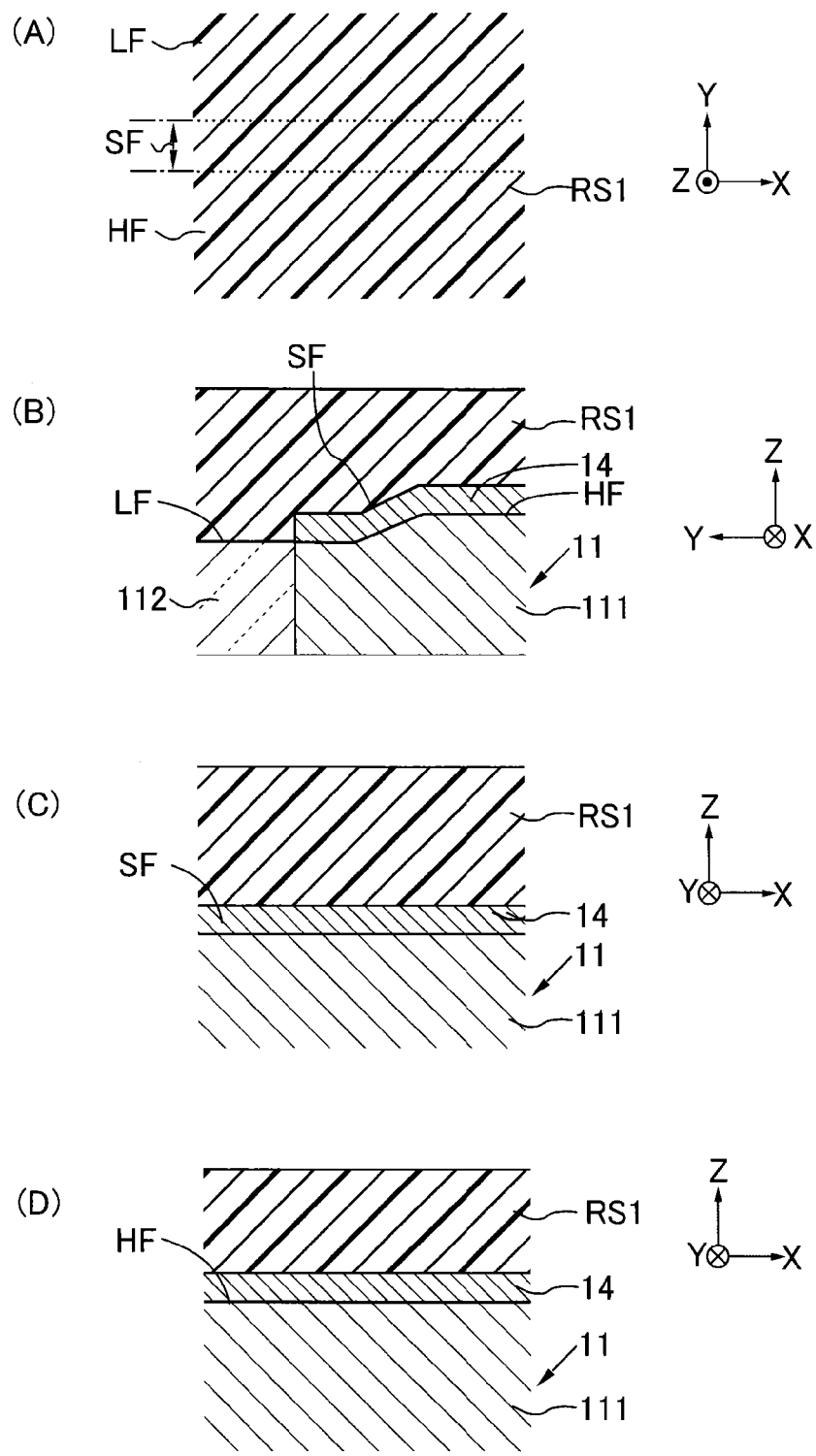
FIG. 11 is a drawing showing a step after the step shown in FIG. 10.
Figure 12:
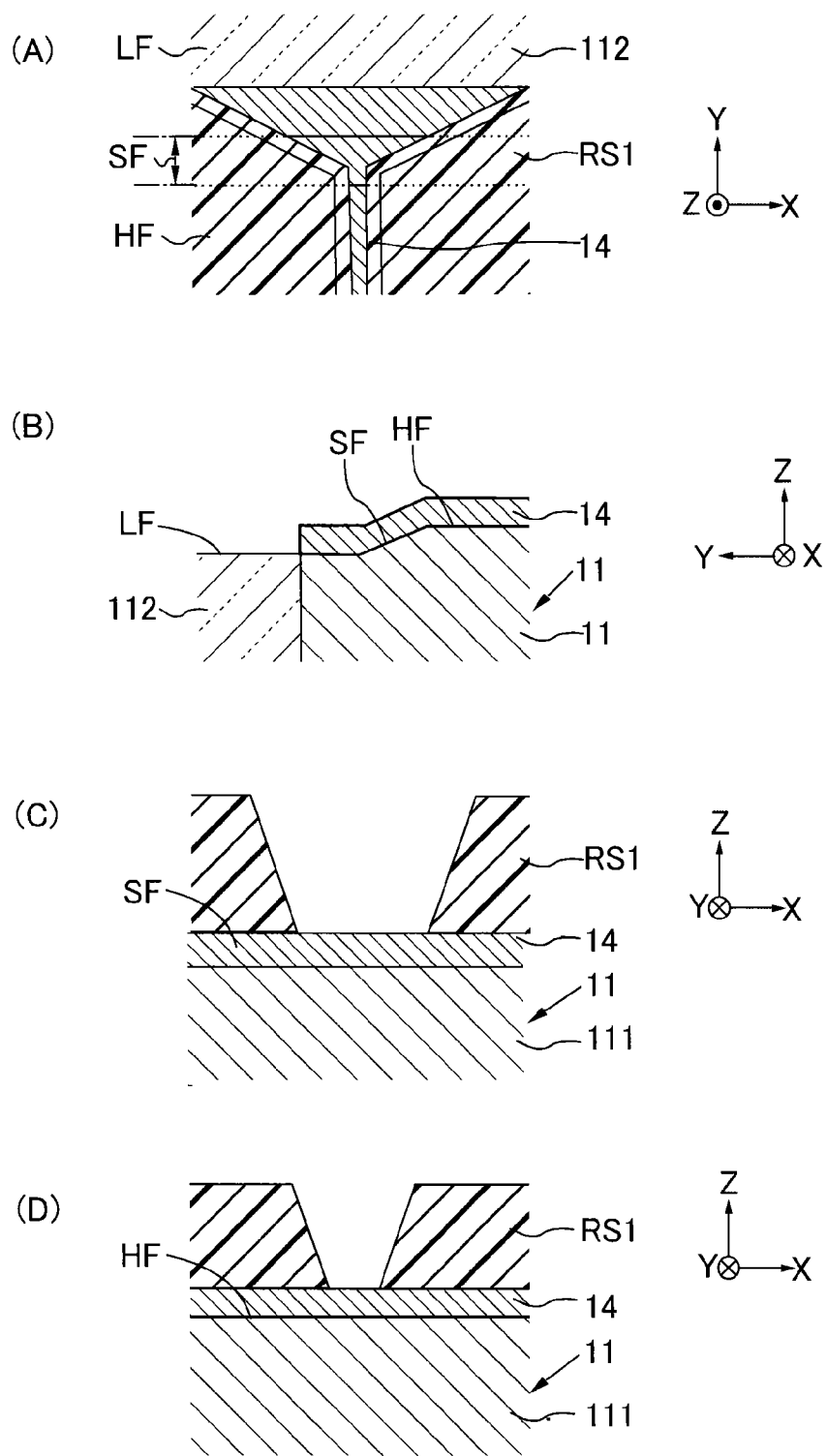
FIG. 12 is a drawing showing a step after the step shown in FIG. 11.

Prior to detailed description, individual views and their positional relationships in FIGS. 9 to 24 will be explained below. In FIG. 9, at first, FIG. 9(A) is a plan view as seen in a stacking direction, showing a part of a wafer after formation of the first support layer 11 including the leading shield 111 and the non-magnetic layer 112, FIG. 9(B) is a sectional view taken along the line B-B and seen in the direction of arrows in FIG. 9(A), FIG. 9(C) is a sectional view taken along the line C-C and seen in the direction of arrows in FIG. 9(B), corresponding to the slope part SF of the first support layer, and FIG. 9(D) is a sectional view taken along the line D-D and seen in the direction of arrows in FIG. 9(B), corresponding to the high-level flat part HF of the first support layer. FIGS. 10 to 24 have similar views and positional relationships. In FIGS. 10 to 24, accordingly, FIGS. 10(A) to 24(A) are plan views, FIGS. 10(B) to 24(B) are sectional views taken along the line B-B and seen in the direction of arrows in FIGS. 10(A) to 24(A), FIGS. 10(C) to 24(C) are sectional views taken along the line C-C and seen in the direction of arrows in FIGS. 10(B) to 24(B), and FIGS. 10(D) to 24(D) are sectional views taken along the line D-D and seen in the direction of arrows in FIGS. 10(B) to 24(B), and they are in agreement with the positions shown in FIGS. 9(A) and 9(B).

At first, as shown in FIGS. 9(A) to 9(D), the support layer 11 including the leading shield 111 and the non-magnetic layer 112 is formed on a slider substrate. The air bearing side is directed to a lower side in FIG. 9(A) and to a right side in FIG. 9(B). In the present embodiment, the leading shield 111 of the support layer 11 has the slope part SF uprising from the low-level flat part LF toward the air bearing side, and the high-level flat part HF is beyond it.

Then, as shown in FIGS. 10(A) to 10(D), the antireflection film 14 is deposited on the leading shield 111. With the antireflection film 14, the reflectance of the first support layer can be reduced during exposure of a photoresist film RS1 that will be described later. The antireflection film 14 may consist of a single light absorption layer 1411, as shown in FIG. 8(A), but it is also possible to greatly reduce the reflectance by depositing materials of different optical constants in two or more layers, as shown in FIGS. 8(B) to 8(D).

In the leading shield 111, moreover, since the flat part (the low-level flat part LF and the high-level flat part HF) and the slope part SF have different optical reflection properties for exposure light, it is necessary to optimally control the thickness of the antireflection film 14.

To control the thickness, deposition can be performed by a dry process capable of controlling the thicknesses at the low-level flat part LF, the high-level flat part HF and the slope part SF, respectively, such as sputtering, IBD (ion bead deposition), or ALD (atomic layer deposition).

Then, as shown in FIGS. 11(A) to 11(D), a photoresist film RS1 is applied onto the antireflection film 14 by a spin-coating process or the like.

Then, the photoresist film RS1 is exposed to light using a mask having a pattern of the recording magnetic pole film and developed by an alkali developer. Accordingly, as shown in FIGS. 12(A) to 12(D), a cut-out pattern is formed in accordance with the pattern of the recording magnetic pole film.

In this case, as shown in FIGS. 12(C) and 12(D), the inner wall surface of the photoresist film RS1 thus developed is inclined at a certain inclination angle. The cut-out pattern has a relatively large width at a portion corresponding to the second small-width portion, as shown in FIG. 12(C), but has a relatively small width at the first small-width portion, as shown in FIG. 12(D).

Figure 13:
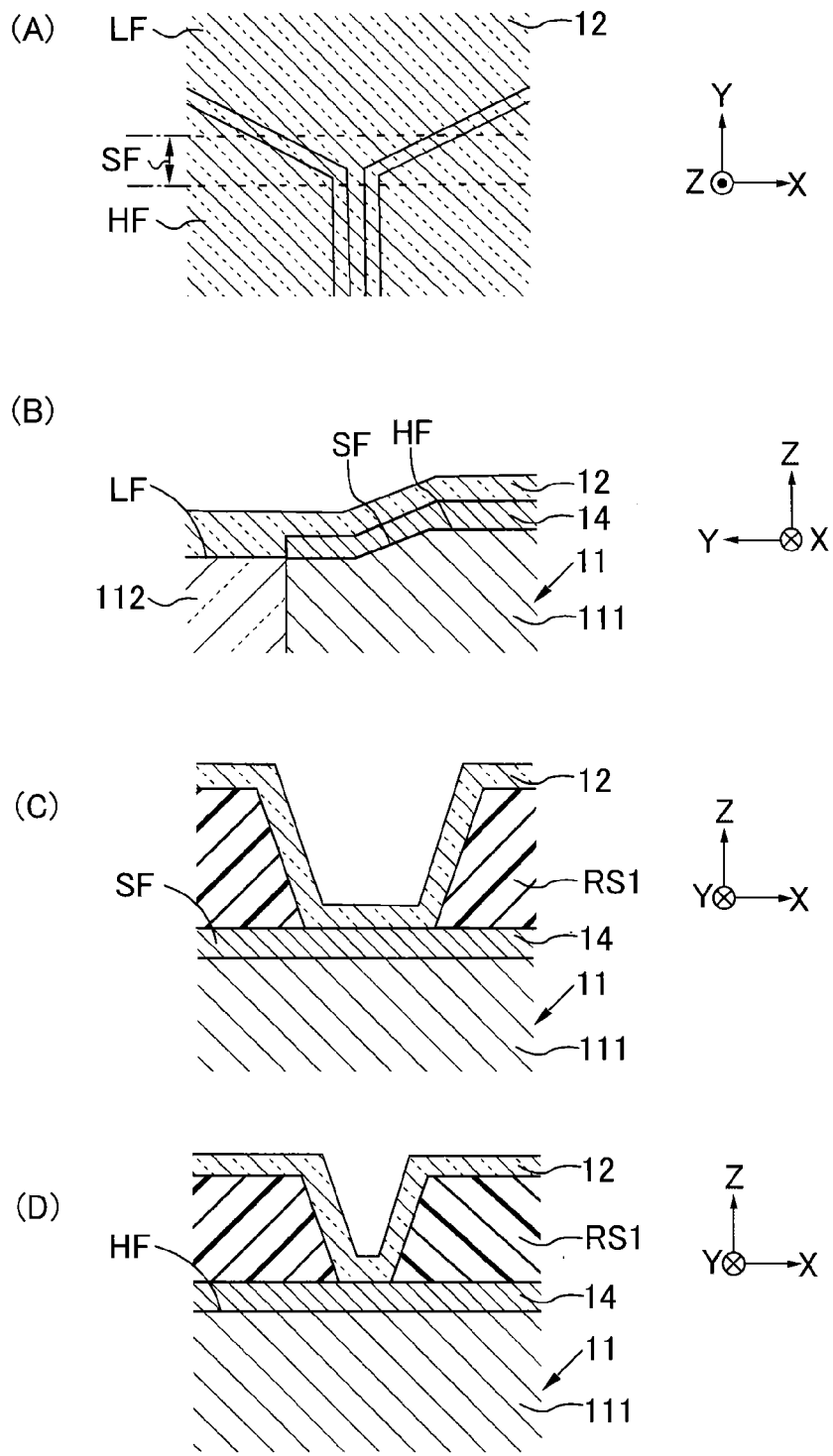
FIG. 13 is a drawing showing a step after the step shown in FIG. 12.

Then, by means of sputtering or the like, the non-magnetic film 12 is formed on the top face and the inner side face of the photoresist film RS1 and on the top face of the first support layer 11 exposed within the cut-out pattern, as shown in FIG. 13. In this figure, the non-magnetic film 12 has a simple single-layer film structure, but may have a structure in which different materials are stacked using different deposition processes.

Figure 14:
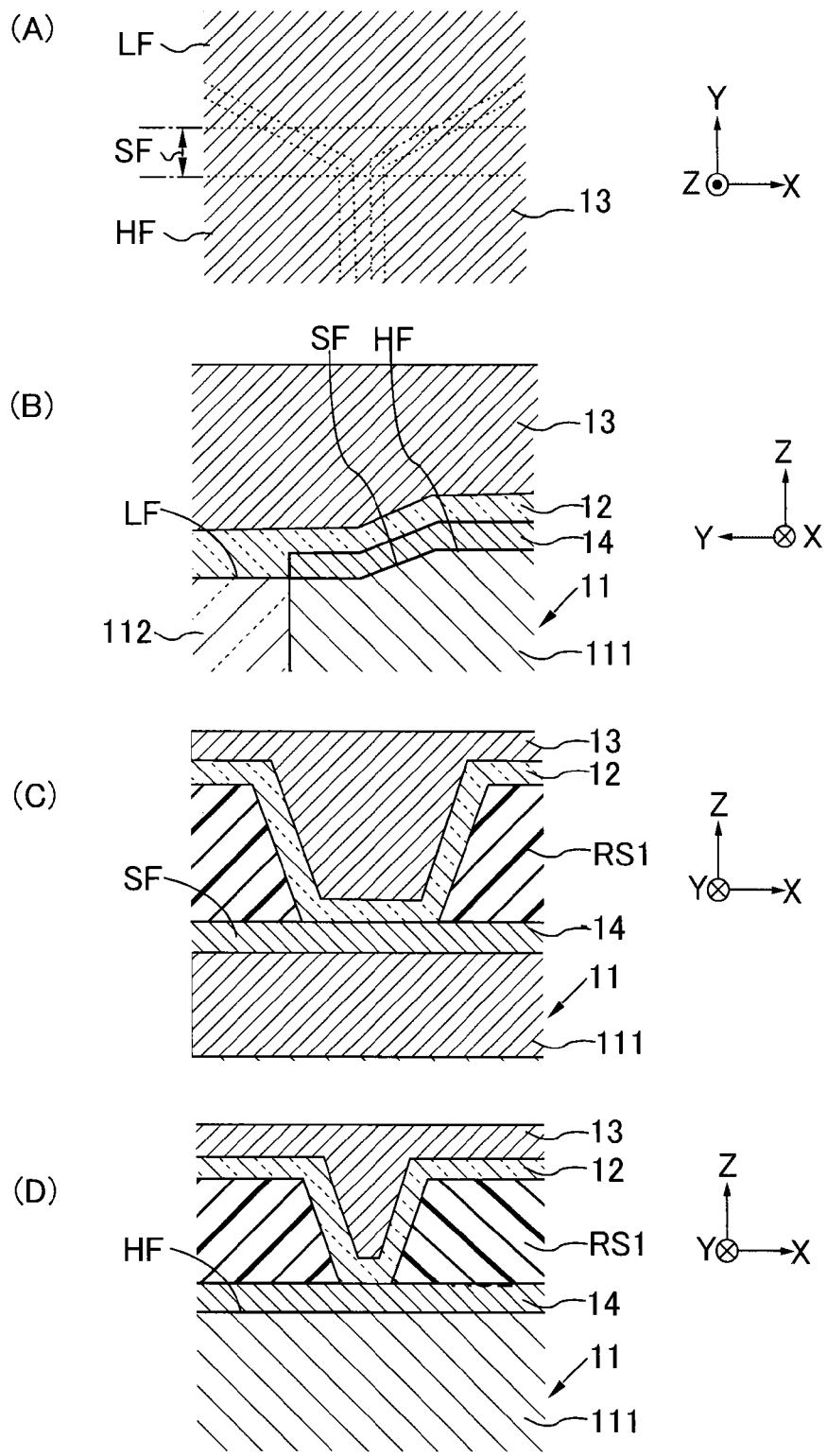
FIG. 14 is a drawing showing a step after the step shown in FIG. 13.

Then, as shown in FIG. 14, a magnetic film 13 which becomes a recording magnetic pole film is formed by plating.

Figure 15:
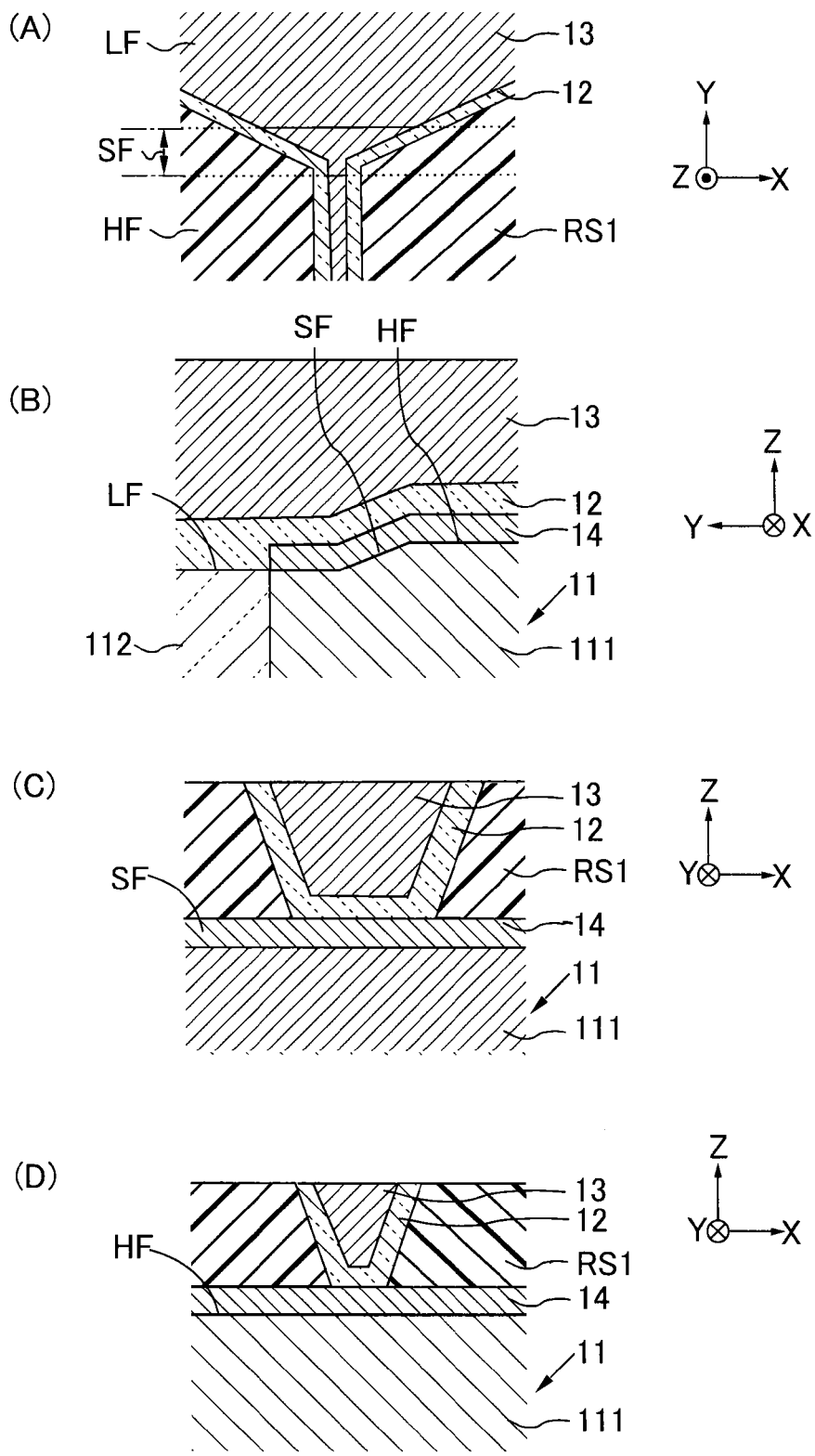
FIG. 15 is a drawing showing a step after the step shown in FIG. 14.
Figure 16:
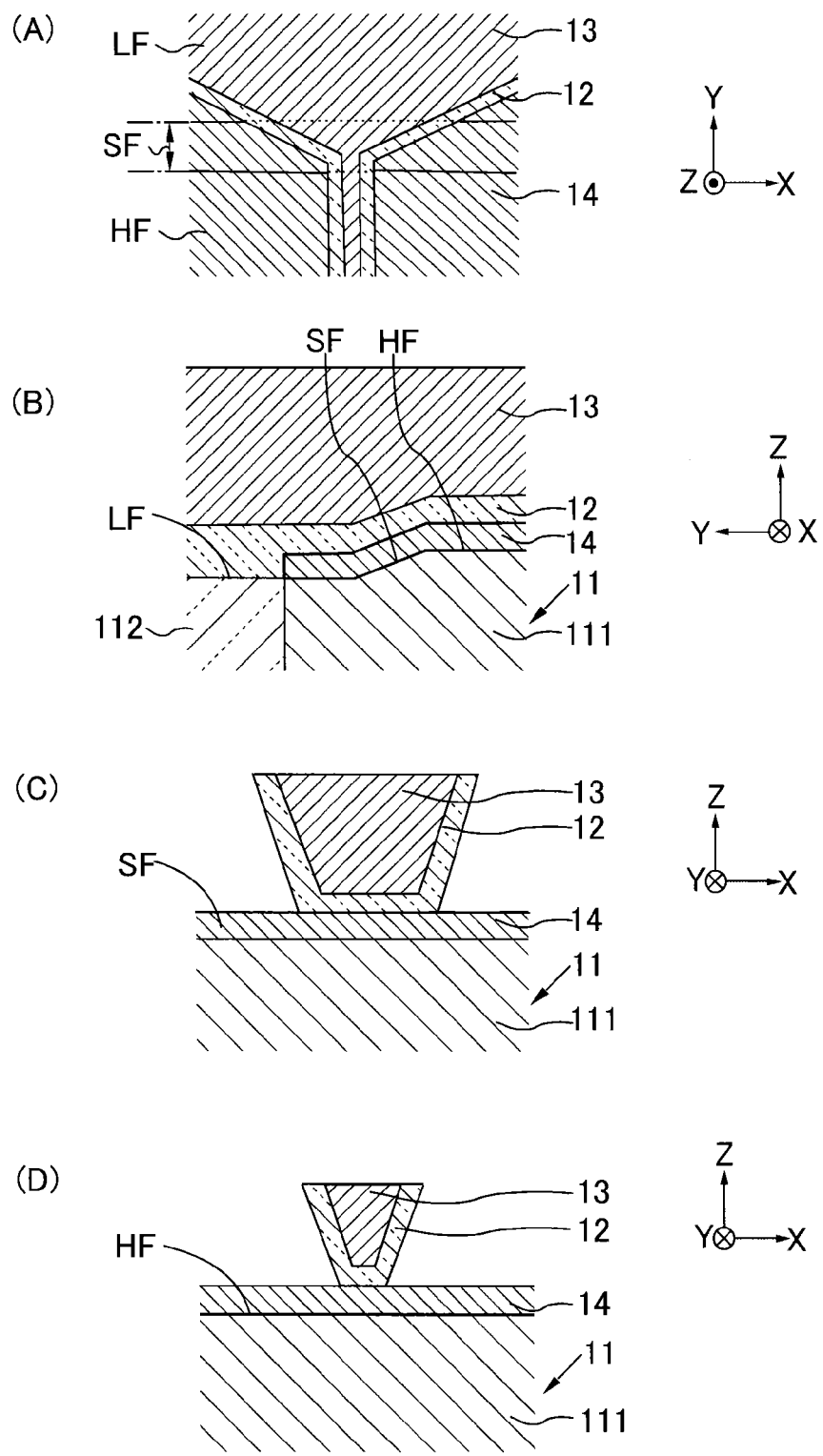
FIG. 16 is a drawing showing a step after the step shown in FIG. 15.

Then, the photoresist film RS1 is exposed by milling or the like, as shown in FIG. 15, and thereafter, the photoresist film RS1 is removed, as shown in FIG. 16.

Figure 17:
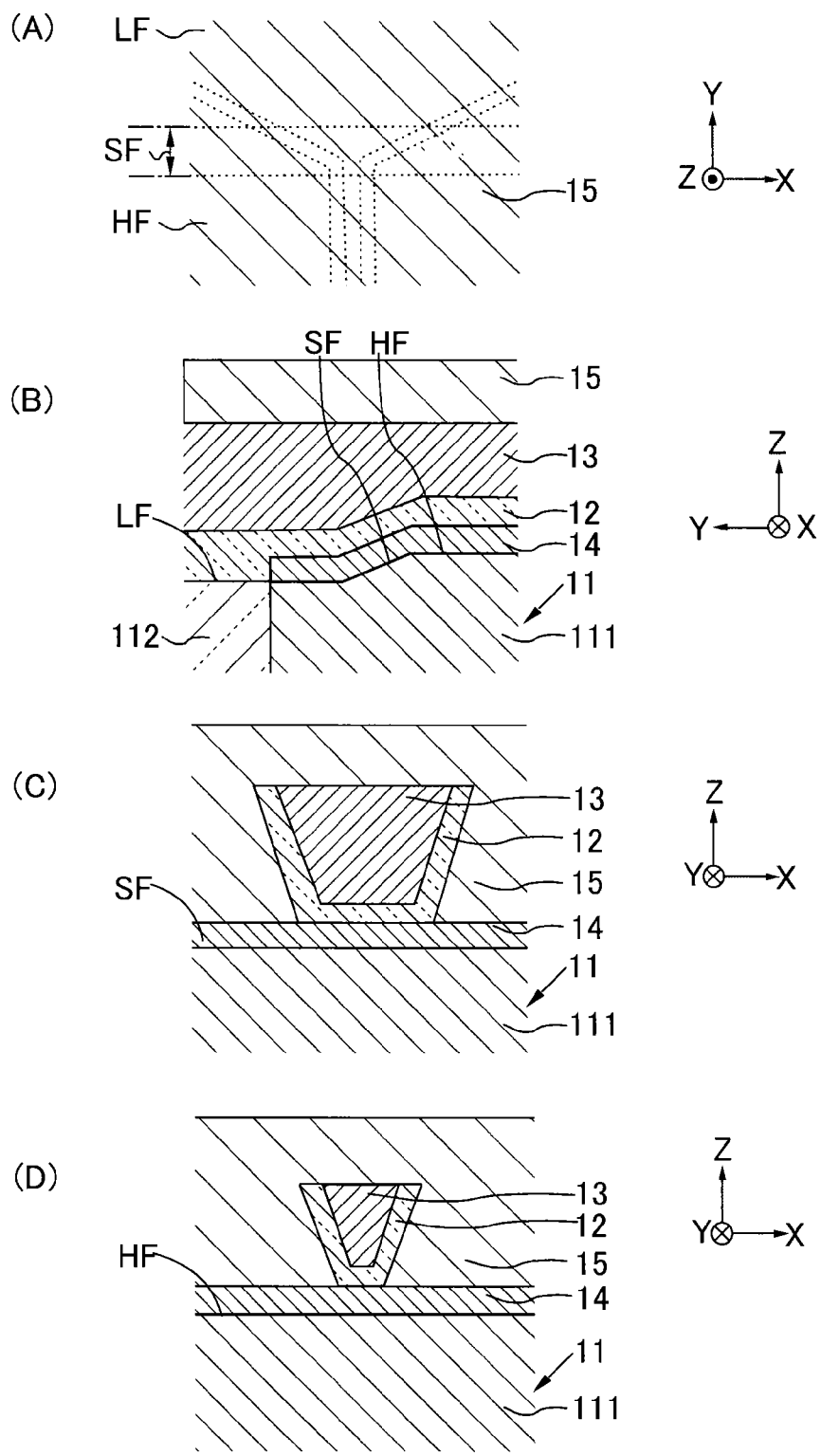
FIG. 17 is a drawing showing a step after the step shown in FIG. 16.
Figure 18:
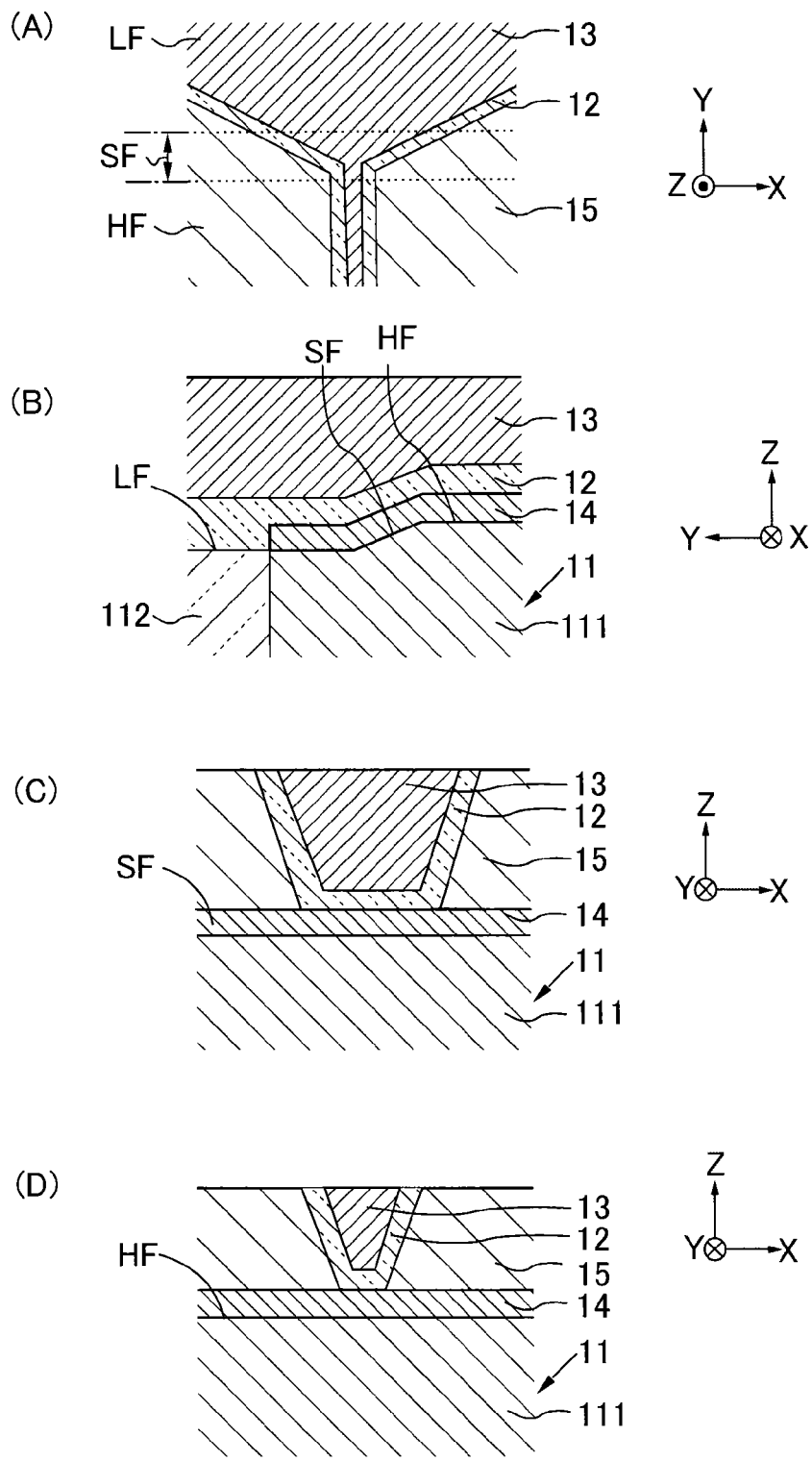
FIG. 18 is a drawing showing a step after the step shown in FIG. 17.

Next, the second support layer 15 is formed by sputtering or the like, as shown in FIG. 17, and then, the surface of the second support layer 15 is flattened by CMP or the like, as shown in FIG. 18. Thereafter, well-known processes are further performed to produce the thin-film magnetic head shown in FIGS. 1 to 7.

FIGS. 19 to 24 are drawings showing a process of removing a part or all of the antireflection film 14 in the foregoing process of manufacturing the thin-film magnetic head according to the present invention. Individual views of FIGS. 19 to 24 are shown in the same manner as those of FIGS. 9 to 18.

Figure 19:
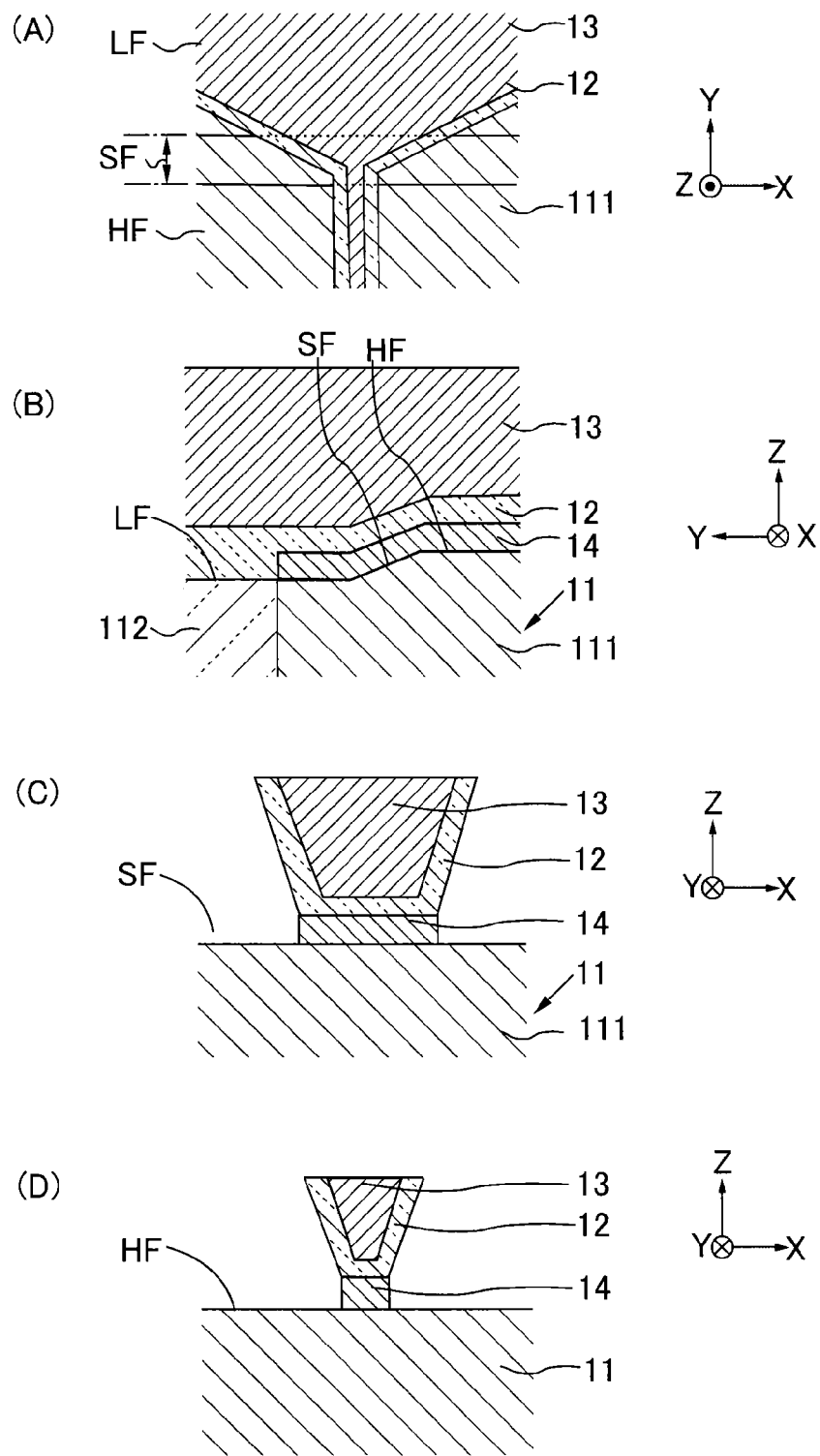
FIG. 19 is a drawing showing a step of removing a part of an antireflection film shown in FIG. 16.
Figure 20:
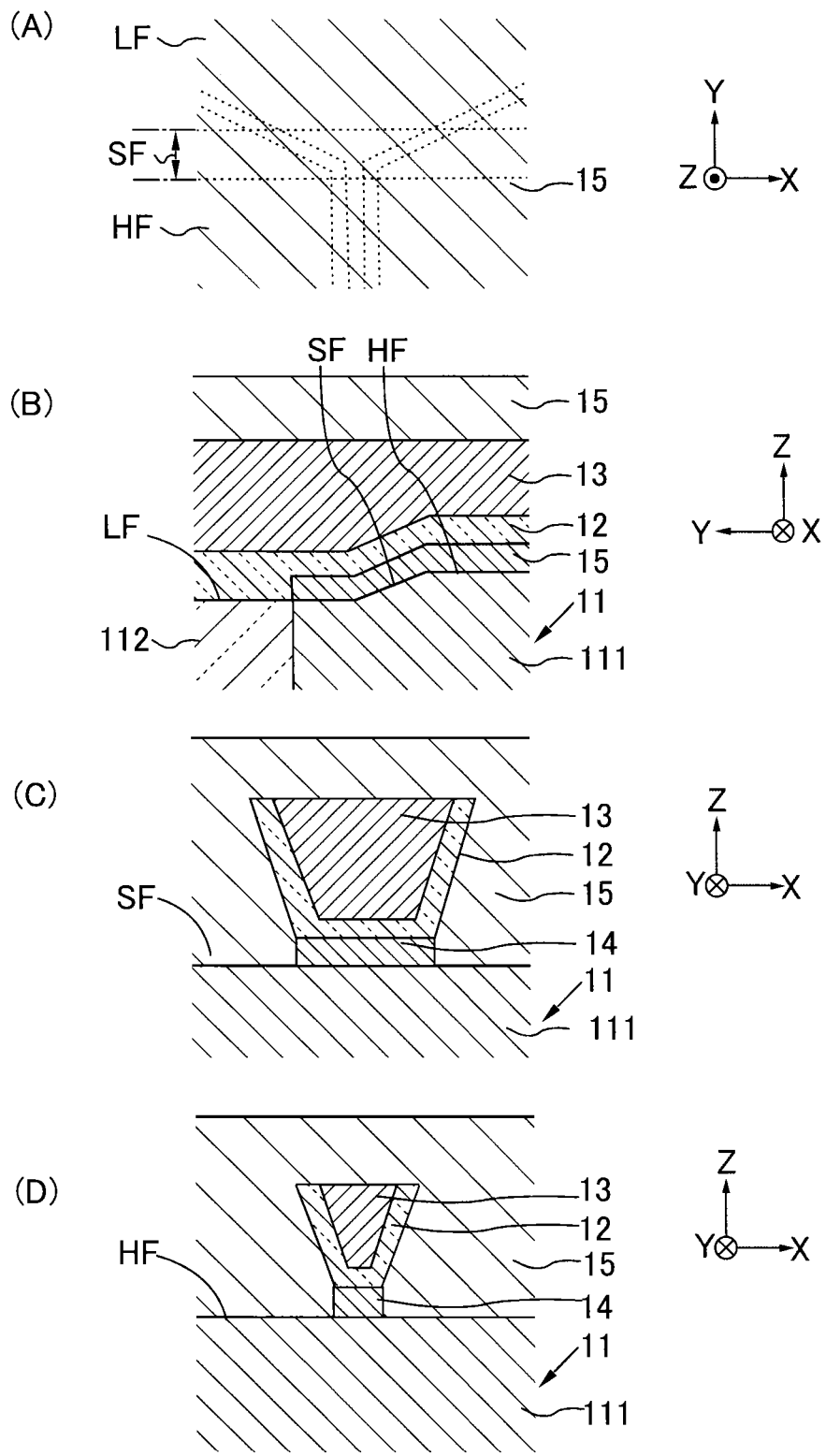
FIG. 20 is a drawing showing a step after the step shown in FIG. 19.
Figure 21:
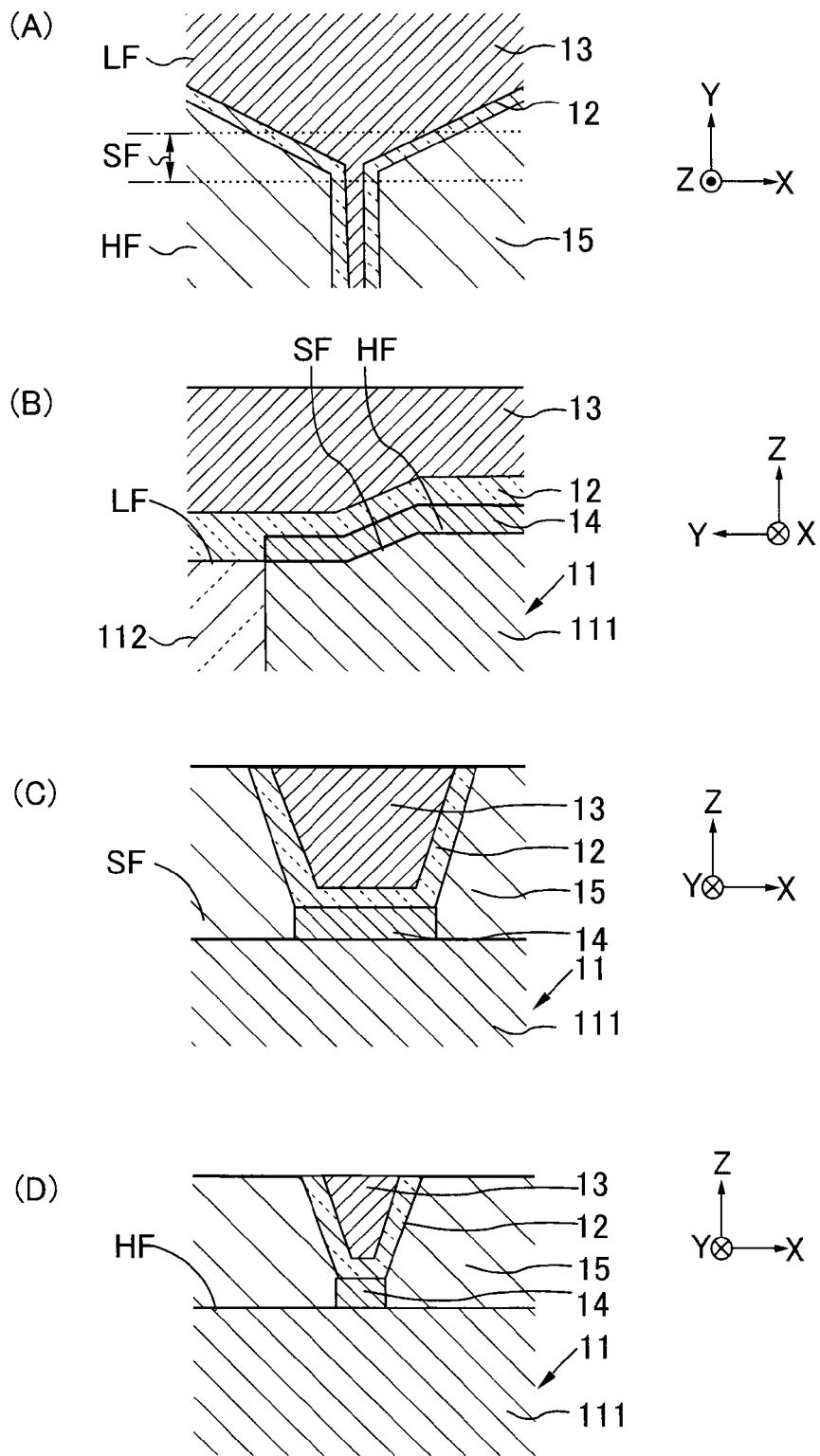
FIG. 21 is a drawing showing a step after the step shown in FIG. 20.

FIGS. 19 to 21 illustrate a process of removing a part of the antireflection film 14. After the step of FIG. 16, the antireflection film 14 is removed by dry etching, wet etching or the like except a portion lying beneath the non-magnetic film 12, as shown in FIG. 19. Then, the second support layer 15 is formed by sputtering or the like, as shown in FIG. 20, and then, the surface of the second support layer 15 is flattened by CMP or the like, as shown in FIG. 21.

Figure 22:
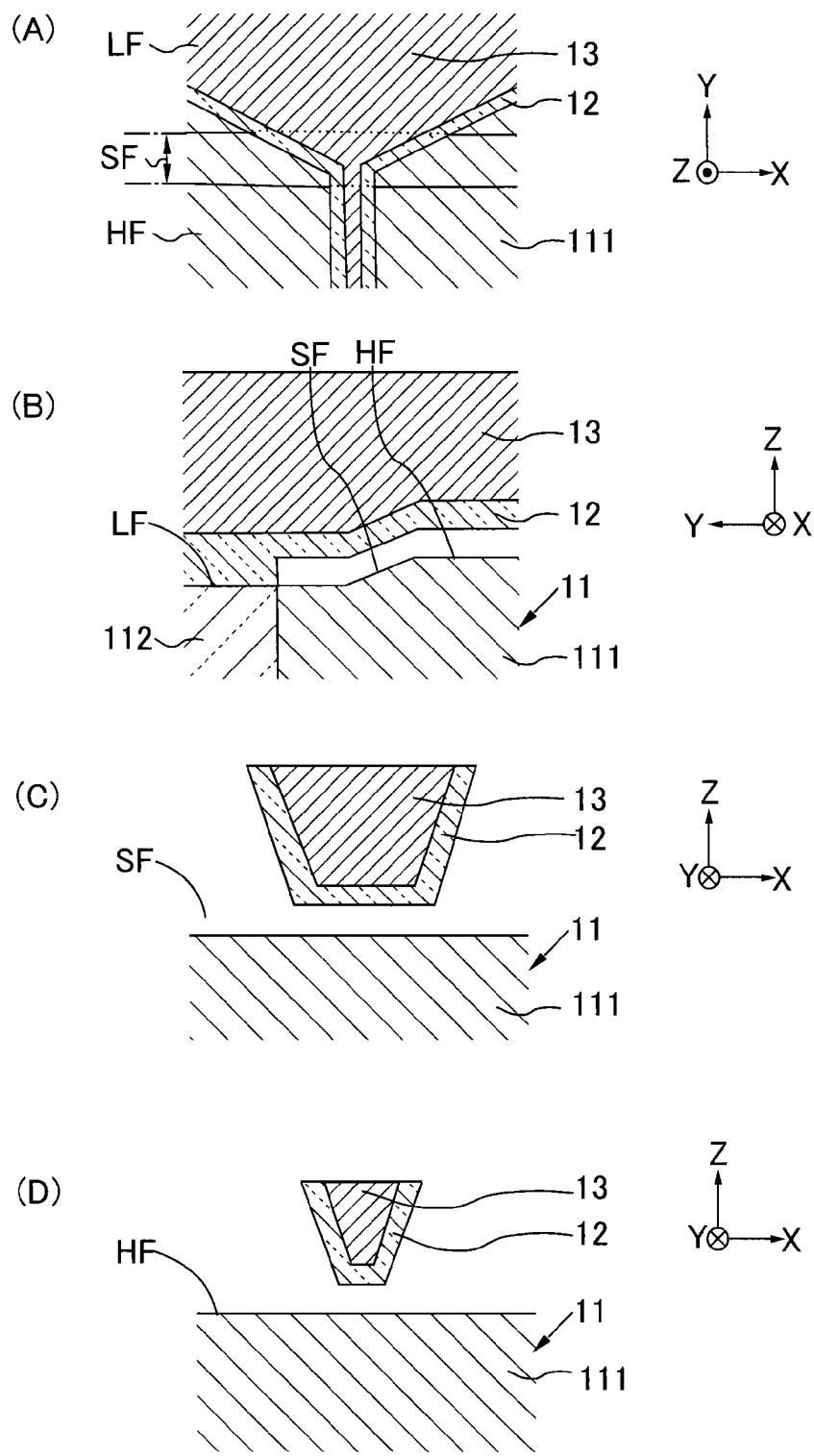
FIG. 22 is a drawing showing a step of entirely removing an antireflection film shown in FIG. 16.
Figure 23:
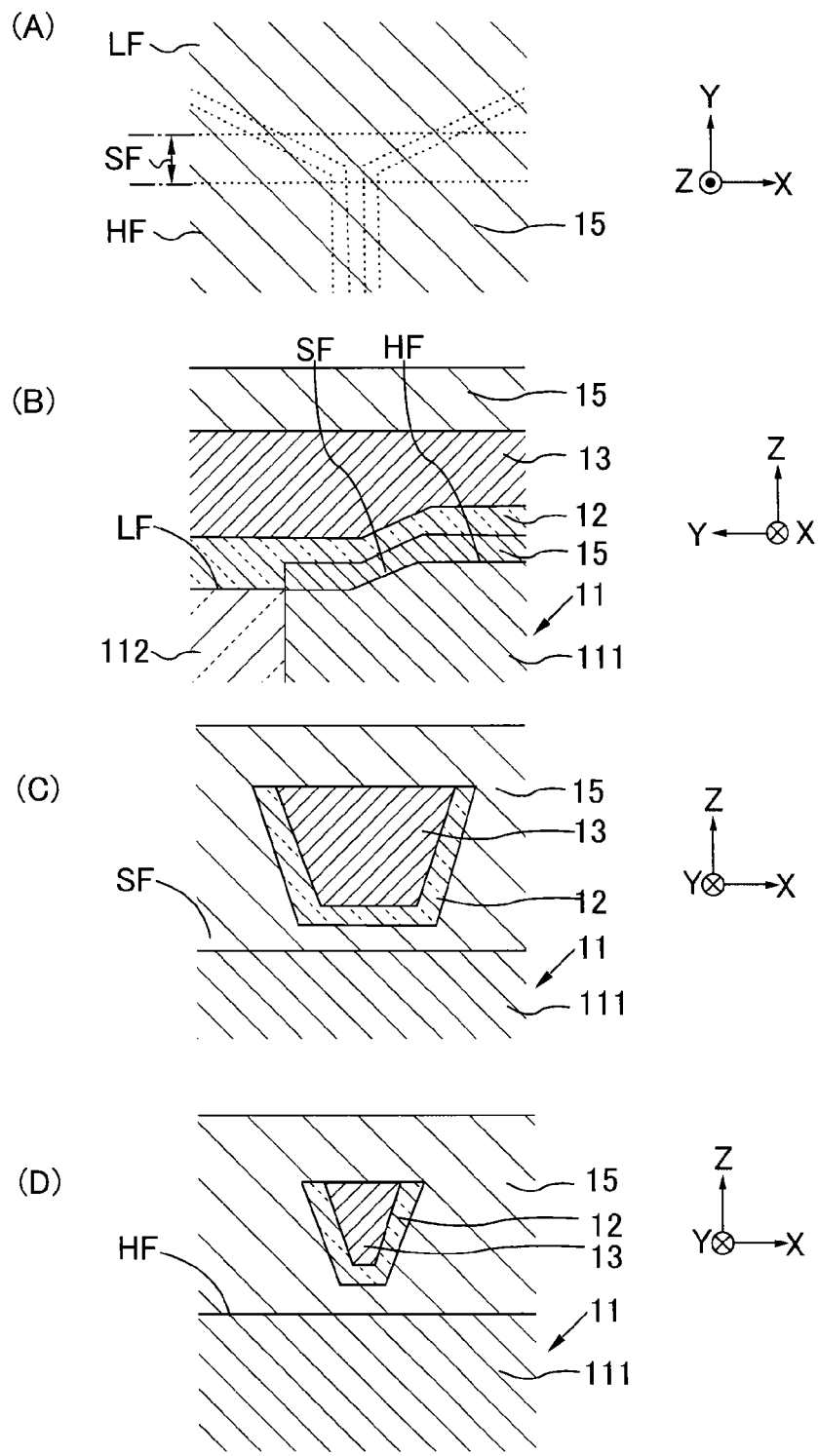
FIG. 23 is a drawing showing a step after the step shown in FIG. 22.
Figure 24:
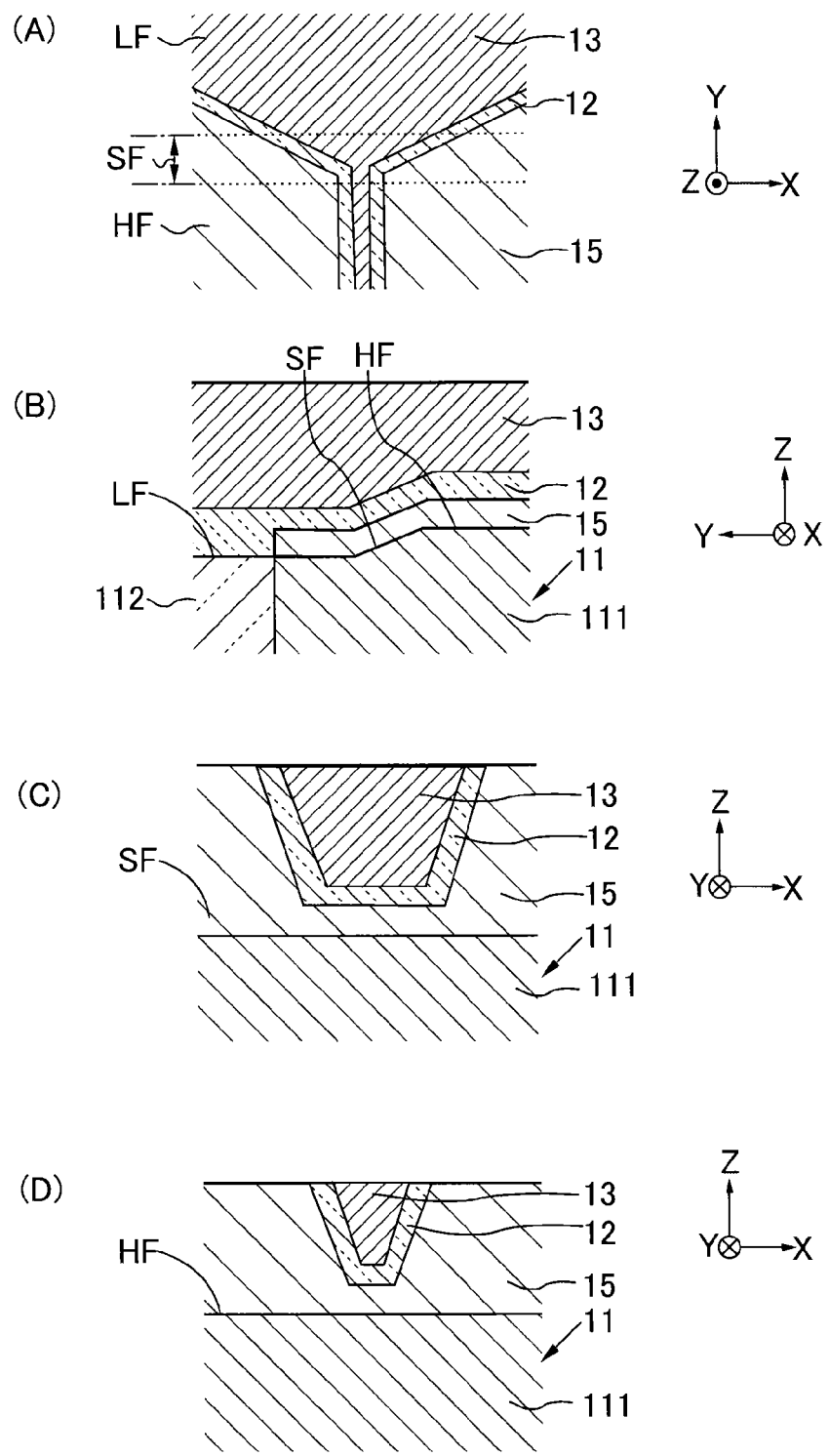
FIG. 24 is a drawing showing a step after the step shown in FIG. 23.

FIGS. 22 to 24 illustrate a process of removing the entire antireflection film 14. After the step of FIG. 16, the antireflection film 14 is entirely removed, as shown in FIG. 22. Then, the second support layer 15 is formed by sputtering or the like, as shown in FIG. 23, and then, the surface of the second support layer 15 is flattened by CMP or the like, as shown in FIG. 24.

3. Thin-Film Magnetic Head Device

The present invention further discloses a thin-film magnetic head device. The thin-film magnetic head device includes the foregoing thin-film magnetic head and a head support device. The head support device supports the thin-film magnetic head in such a manner as to permit rolling and pitching of the thin-film magnetic head. In the present invention, examples of the thin-film magnetic head device include an HGA (head gimbal assembly) in which the thin-film magnetic head is mounted on a head support device (gimbal) and an HAA (head arm assembly) in which the HGA is mounted on an arm.

Figure 25:
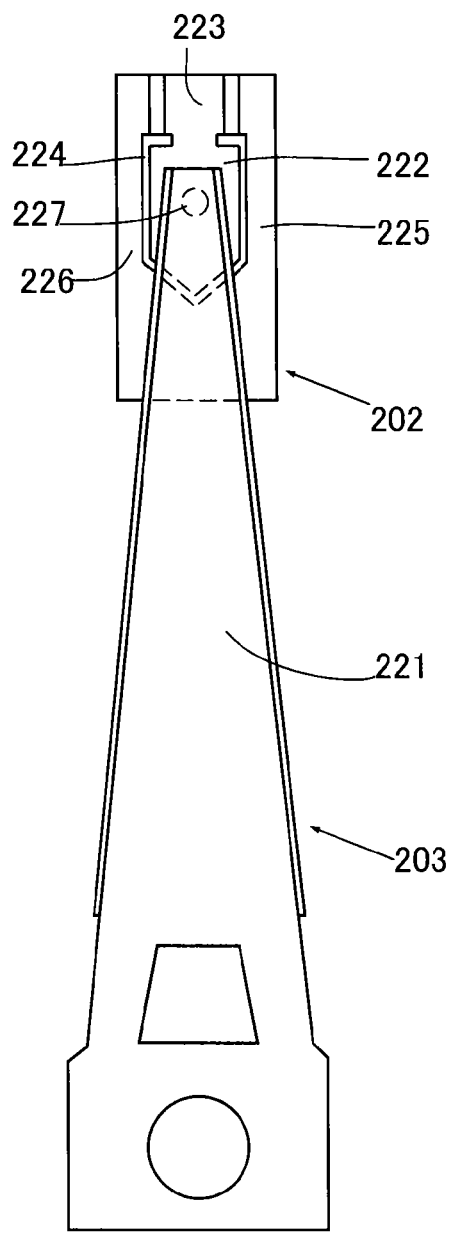
FIG. 25 is a drawing showing a magnetic head device according to the present invention.
Figure 26:
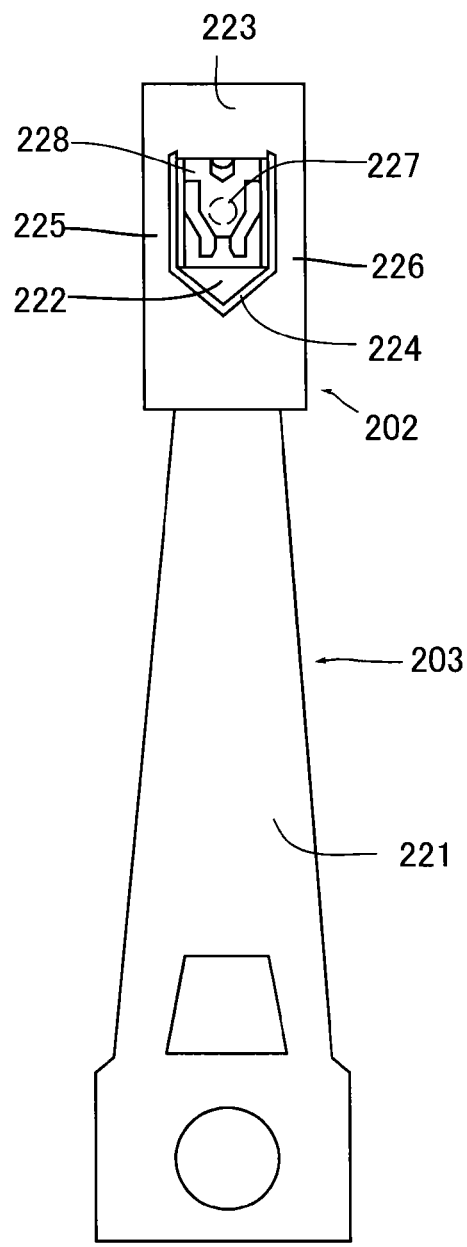
FIG. 26 is a bottom view of the magnetic head device shown in FIG. 23.

FIG. 25 is a front view of a thin-film magnetic head device according to the present invention, and FIG. 26 is a bottom view of the thin-film magnetic head device shown in FIG. 25. The illustrated thin-film magnetic head device is an HGA including a suspension 203 and a thin-film magnetic head 228. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The thin-film magnetic head 228 is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The thin-film magnetic head 228 is attached to one side of the tongue portion 222 by means of an adhesive or the like, which is kept in spring contact with the tip of the load dimple 227.

One face of the thin-film magnetic head 228 opposite from the air bearing surface 70 of the slider is attached to the tongue portion 222 of the suspension 203. Flexible leads and so on not shown in the drawings are connected to the thin-film magnetic head 228.

Figure 27:
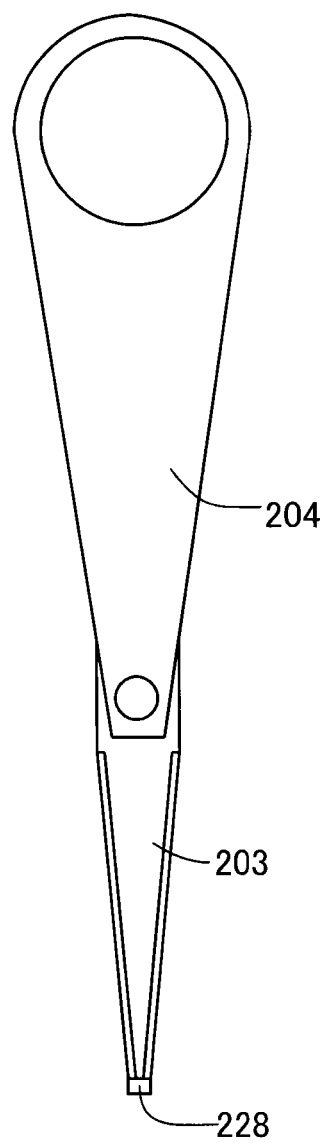
FIG. 27 is a drawing showing another embodiment of a magnetic head device according to the present invention.

FIG. 27 is a front view of an HAA. The illustrated HAA includes the suspension 203, the thin-film magnetic head 228 and an arm 204. The arm 204 is integrally formed from a suitable non-magnetic metallic material such as aluminum alloy. The arm 204 is provided with a mounting hole. The mounting hole is used for mounting on a positioning device provided in a magnetic disk apparatus. One end of the suspension 203 is secured to the arm 204, for example, with a ball connecting structure.

4. Magnetic Recording/Reproducing Apparatus

Figure 28:
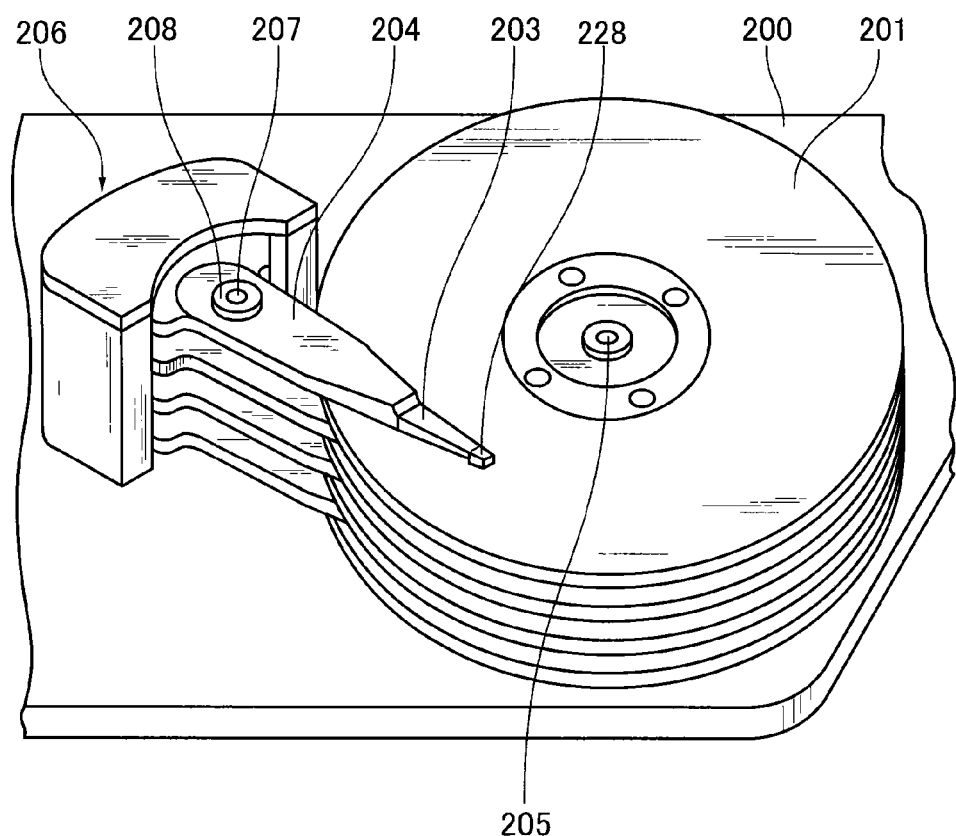
FIG. 28 is a drawing showing a magnetic recording/reproducing apparatus according to the present invention.

Next will be described a structure of a magnetic recording/reproducing apparatus equipped with the thin-film magnetic head according to the present invention. FIG. 28 shows the structure of the magnetic recording/reproducing apparatus. The magnetic recording/reproducing apparatus is, for example, a hard disk drive equipped with the foregoing thin-film magnetic head.

As shown in FIG. 28, for example, the magnetic recording/reproducing apparatus includes, within a case 200, magnetic disks (e.g., hard disks) 201, a plurality of suspensions 203 disposed for the magnetic disks 201 and supporting the thin-film magnetic head at their one end, and a plurality of arms 204 supporting the other end of the suspensions 203. The magnetic disks 201 are rotatable about a spindle motor 205 which is fixed to the case 200. The arms 204 are connected to an actuator 206 being a power source and are pivotable through a bearing 208 about a fixed shaft 207 which is fixed to the case 200.

The actuator 206 is constructed to include, for example, a driving source such as a voice coil motor. This magnetic recording/reproducing apparatus is of the type having a plurality of arms 204 integrally pivotable about the fixed shaft 207, for example. In FIG. 28, the case 200 is shown in a partially cut-away state, making it easy to see the internal structure of the magnetic recording/reproducing apparatus.

The thin-film magnetic head 228 is the thin-film magnetic head according to the present invention. When the magnetic disk 201 rotates for recording or reproducing of information, the thin-film magnetic head 228 takes off from a recording surface of the magnetic disk 201 utilizing an airflow generated between the recording surface (thin-film magnetic head-facing surface) of the magnetic disk 201 and the air bearing surface 70, and performs magnetic recording or reproducing.

Since the thin-film magnetic head 228 used in the magnetic recording/reproducing apparatus is the thin-film magnetic head according to the present invention, moreover, the opposite side faces ST of the recording magnetic pole film appearing in the track width direction are smooth without roughness, which makes it possible to improve write performance.

The present invention has been described in detail above with reference to preferred embodiments. However, obviously those skilled in the art could easily devise various modifications of the invention based on the technical concepts underlying the invention and teachings disclosed herein.

What is claimed is:

1. A thin-film magnetic head comprising a slider substrate, an antireflection film and a write element, the slider substrate having an air bearing surface at one side and supporting a first support layer, the first support layer having a leading shield, the leading shield having a low-level flat part, a slope part and a high-level flat part continuously arranged at one side in the name order toward the air bearing surface, the antireflection film entirely covering the low-level flat part, the slope part and the high-level flat part of the leading shield, the write element having a recording magnetic pole film, the recording magnetic pole film being formed above the antireflection film.

2. The thin-film magnetic head as claimed in claim 1, wherein the antireflection film has a light absorption layer and an antireflection protective film.

3. The thin-film magnetic head as claimed in claim 1, wherein the antireflection film has a composite layer, the composite layer being composed of a single light absorption layer and an adjacent single transparent film.

4. The thin-film magnetic head as claimed in claim 3, wherein the antireflection film has an antireflection protective film.

5. The thin-film magnetic head as claimed in claim 4, wherein the antireflection film has a plurality of the composite layers.

6. The thin-film magnetic head as claimed in claim 3, wherein the antireflection film has a plurality of the composite layers.

7. A thin-film magnetic head device comprising a thin-film magnetic head and a head support device, the thin-film magnetic head being claimed in claim 1, the head support device supporting the thin-film magnetic head.

8. A magnetic recording/reproducing apparatus comprising a thin-film magnetic head device and a magnetic recording medium, the thin-film magnetic head device being claimed in claim 7, the thin-film magnetic head device being capable of performing magnetic recording and reproducing with the magnetic recording medium.

9. A method for manufacturing a thin-film magnetic head, the thin-film head having a slider substrate, an antireflection film and a write element, the slider substrate having an air bearing surface at one side and supporting a first support layer, the first support layer having a leading shield, the leading shield having a low-level flat part, a slope part and a high-level flat part continuously arranged at one side in the name order toward the air bearing surface, the antireflection film entirely covering the low-level flat part, the slope part and the high-level flat part of the leading shield, the write element having a recording magnetic pole film, the recording magnetic pole film being formed above the antireflection film, the thin-film magnetic head manufacturing method comprising the steps of:

depositing the antireflection film over the low-level flat part, the slope part and the high-level flat part of the leading shield;

applying a photoresist film; and performing a photolithography process on the photoresist film according to a pattern required for the recording magnetic pole film so as to form a cut-out pattern by exposure and developing.

10. The thin-film magnetic head manufacturing method as claimed in claim 9, further comprising, after the formation of the cut-out pattern, steps of forming the recording magnetic pole film within the cut-out pattern and removing the photoresist film.

11. The thin-film magnetic head manufacturing method as claimed in claim 10, further comprising, after the removal of the photoresist film, a step of forming a second support layer around the recording magnetic pole film.

12. The thin-film magnetic head manufacturing method as claimed in claim 9, further comprising a step of removing a part of the antireflection film.

13. The thin-film magnetic head manufacturing method as claimed in claim 12, further comprising, after the formation of the cut-out pattern, steps of forming the recording magnetic pole film within the cut-out pattern and removing the photoresist film and further removing a part of the antireflection film.

14. The thin-film magnetic head manufacturing method as claimed in claim 13, further comprising, after the removal of the photoresist film and a part of the antireflection film, a step of forming a second support layer around the recording magnetic pole film.

15. The thin-film magnetic head manufacturing method as claimed in claim 12, wherein the antireflection film has a light absorption layer and an antireflection protective film.

16. The thin-film magnetic head manufacturing method as claimed in claim 12, wherein the antireflection film has a composite layer, the composite layer being composed of a single light absorption layer and an adjacent single transparent film.

17. The thin-film magnetic head manufacturing method as claimed in claim 16, wherein the antireflection film has an antireflection protective film.

18. The thin-film magnetic head manufacturing method as claimed in claim 17, wherein the antireflection film has a plurality of the composite layers.

19. The thin-film magnetic head manufacturing method as claimed in claim 16, wherein the antireflection film has a plurality of the composite layers.

20. The thin-film magnetic head manufacturing method as claimed in claim 9, wherein the antireflection film has a light absorption layer and an antireflection protective film.

21. The thin-film magnetic head manufacturing method as claimed in claim 9, wherein the antireflection film has a composite layer, the composite layer being composed of a single light absorption layer and an adjacent single transparent film.

22. The thin-film magnetic head manufacturing method as claimed in claim 21, wherein the antireflection film has an antireflection protective film.

23. The thin-film magnetic head manufacturing method as claimed in claim 22, wherein the antireflection film has a plurality of the composite layers.

24. The thin-film magnetic head manufacturing method as claimed in claim 21, wherein the antireflection film has a plurality of the composite layers.

25. A method for manufacturing a thin-film magnetic head, the thin-film magnetic head having a slider substrate and a write element, the slider substrate having an air bearing surface at one side and supporting a first support layer, the first support layer having a leading shield, the leading shield having a low-level flat part, a slope part and a high-level flat part continuously arranged at one side in the name recited order toward the air bearing surface, the write element having a recording magnetic pole film, the recording magnetic pole film being formed above the leading shield, the thin-film magnetic head manufacturing method comprising the steps of:

depositing an antireflection film over the low-level flat part, the slope part and the high-level flat part of the leading shield;

applying a photoresist film;

performing a photolithography process on the photoresist film according to a pattern required for the recording magnetic pole film so as to form a cut-out pattern by exposure and developing; and removing the entire antireflection film.

26. The thin-film magnetic head manufacturing method as claimed in claim 25, further comprising, after the formation of the cut-out pattern, steps of forming the recording magnetic pole film within the cut-out pattern and removing the photoresist film and further removing the entire antireflection film.

27. The thin-film magnetic head manufacturing method as claimed in claim 26, further comprising, after the removal of the photoresist film and the entire antireflection film, a step of forming a second support layer around the recording magnetic pole film.

28. The thin-film magnetic head manufacturing method as claimed in claim 25, wherein the antireflection film has a light absorption layer and an antireflection protective film.

29. The thin-film magnetic head manufacturing method as claimed in claim 25, wherein the antireflection film has a composite layer, the composite layer being composed of a single light absorption layer and an adjacent single transparent film.

30. The thin-film magnetic head manufacturing method as claimed in claim 29, wherein the antireflection film has an antireflection protective film.

31. The thin-film magnetic head manufacturing method as claimed in claim 30, wherein the antireflection film has a plurality of the composite layers.

32. The thin-film magnetic head manufacturing method as claimed in claim 29, wherein the antireflection film has a plurality of the composite layers.

* * * * *